US012630103B2

(12) United States Patent
Tashiro et al.

(10) Patent No.: US 12,630,103 B2
(45) Date of Patent: May 19, 2026

(54) ONBOARD CONNECTION SYSTEM AND ONBOARD SYSTEM DESIGN METHOD

(71) Applicant: YAZAKI CORPORATION, Tokyo (JP)

(72) Inventors: Hiromu Tashiro, Susono (JP); You Yanagida, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 73 days.

(21) Appl. No.: 18/764,613

(22) Filed: Jul. 5, 2024

(65) Prior Publication Data

US 2024/0359648 A1 Oct. 31, 2024

Related U.S. Application Data

(63) Continuation of application No. PCT/JP2023/005614, filed on Feb. 16, 2023.

(30) Foreign Application Priority Data

Mar. 2, 2022 (JP) ................................. 2022-031889

(51) Int. Cl.
  *B60R 16/03* (2006.01)
  *B60R 16/023* (2006.01)
  *B60R 16/02* (2006.01)
(52) U.S. Cl.
  CPC .......... *B60R 16/03* (2013.01); *B60R 16/0231* (2013.01); *B60R 16/02* (2013.01); *B60R 16/0207* (2013.01)

(58) Field of Classification Search
None
See application file for complete search history.

(56) References Cited

U.S. PATENT DOCUMENTS 8,304,928 B2 * 11/2012 Nagasawa ........... B60R 16/0315
                                                           307/9.1
2019/0366952 A1 * 12/2019 Ikegaya ............... H02H 1/0061
                        (Continued)

FOREIGN PATENT DOCUMENTS

JP        2008-290604 A     12/2008
JP        2018-192872 A     12/2018
                        (Continued)

*Primary Examiner* — Peter D Nolan
*Assistant Examiner* — Michael F Whalen
(74) *Attorney, Agent, or Firm* — KENEALY VAIDYA LLP

(57) ABSTRACT

A zone ECU is disposed in each of a plurality of regions partitioned on a vehicle, and each zone ECU controls a first device disposed in the same region. Independent ECUs are disposed, and each of the independent ECUs controls a second device of a function group independent of the control performed by the zone ECU without relation to the partition of the regions. A central ECU for managing the zone ECU in each of the regions and the independent ECUs is disposed. An onboard power supply is connected to power supply inputs of the zone ECUs and the central ECU Via a first power supply connection path, and the onboard power supply is connected to power supply inputs of the independent ECUs via a second power supply connection path. Power supply electric power to the second device is supplied from the independent ECUs.

4 Claims, 21 Drawing Sheets

(56) References Cited

U.S. PATENT DOCUMENTS

| | | | |
|---|---|---|---|
| 2020/0156571 A1 | 5/2020 | Yasunori | |
| 2021/0251091 A1* | 8/2021 | Suzuki ................. | H05K 5/0221 |
| 2021/0258189 A1 | 8/2021 | Toyoda et al. | |
| 2022/0207129 A1 | 6/2022 | Go et al. | |
| 2022/0416555 A1 | 12/2022 | Yamada et al. | |

FOREIGN PATENT DOCUMENTS

| | | |
|---|---|---|
| JP | 2020-173560 A | 10/2020 |
| JP | 2021-11231 A | 2/2021 |
| JP | 2021-48477 A | 3/2021 |
| JP | 2021-129278 A | 9/2021 |

* cited by examiner

(FIG. 6 CONTINUED)
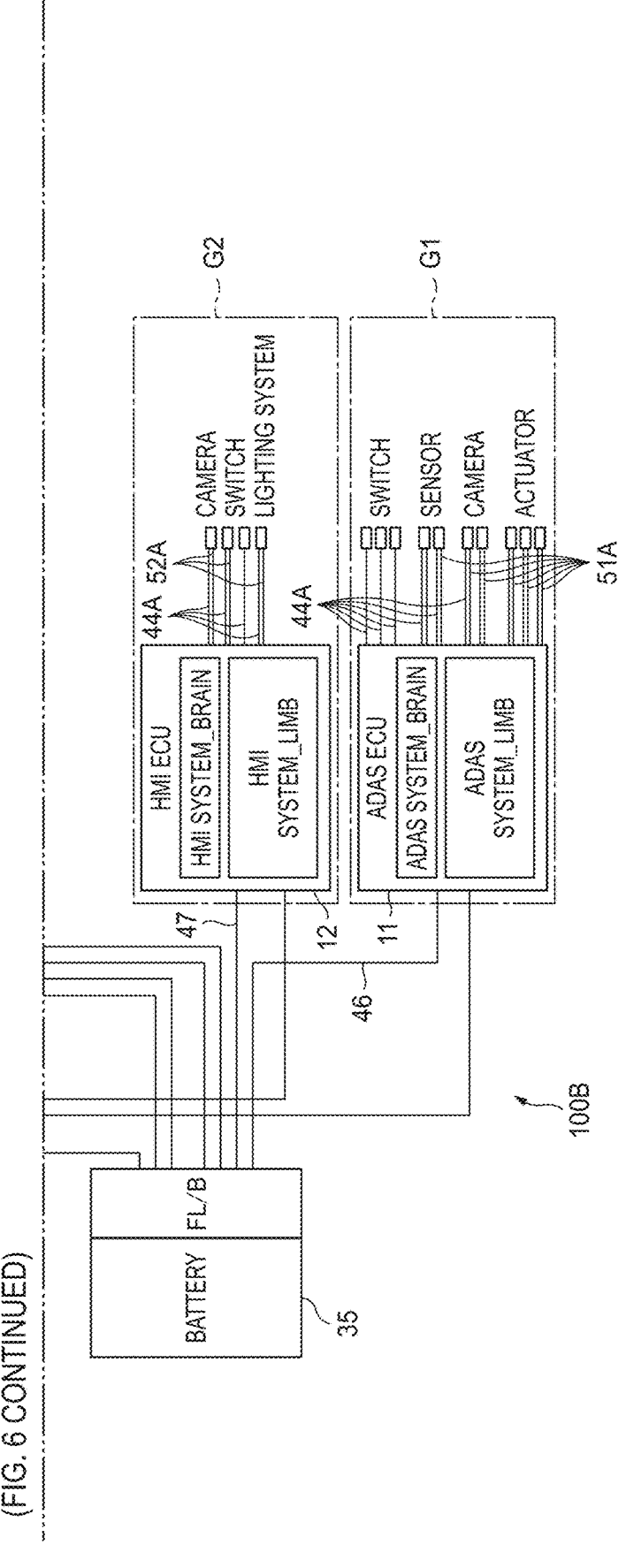

(FIG. 8 CONTINUED)
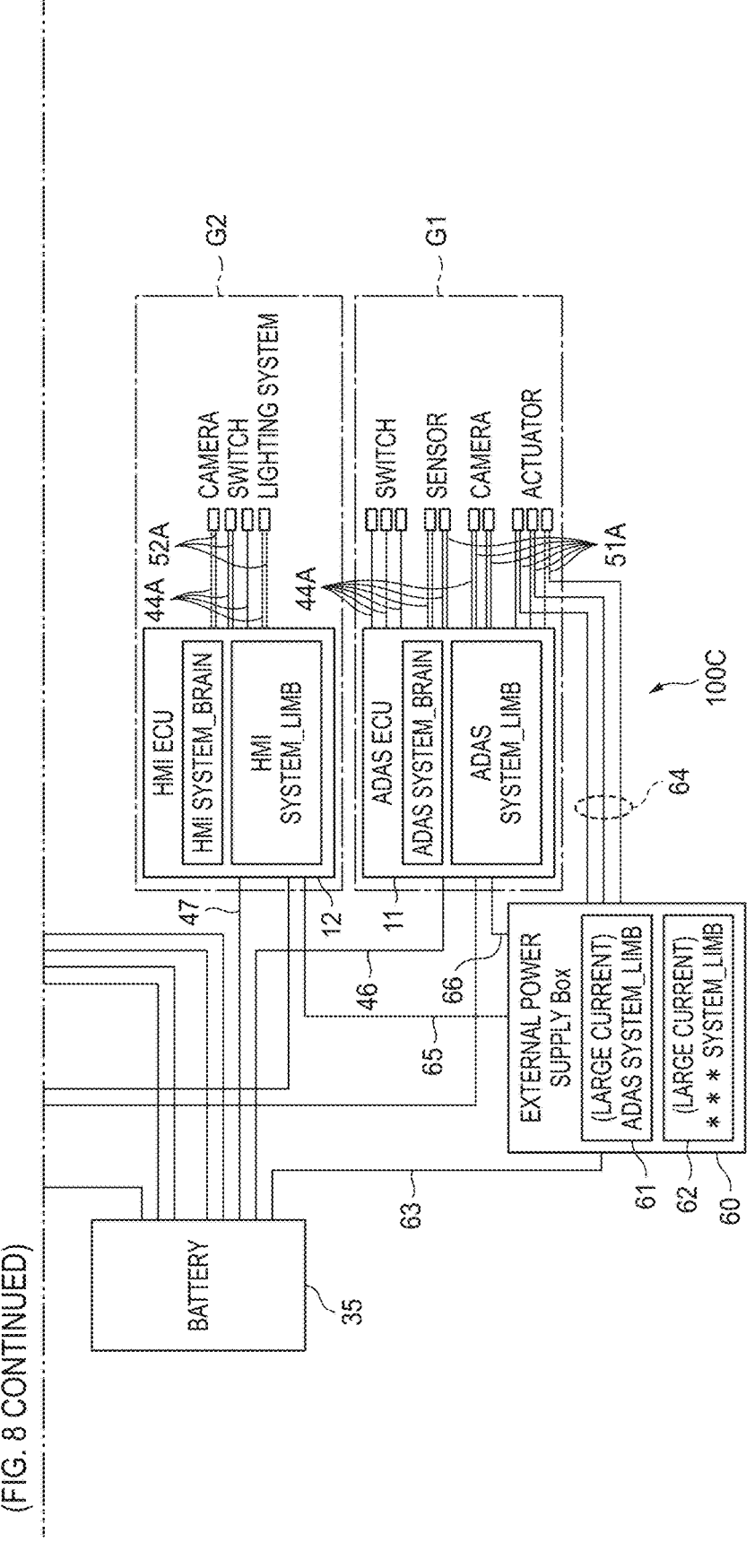

(FIG. 12 CONTINUED)
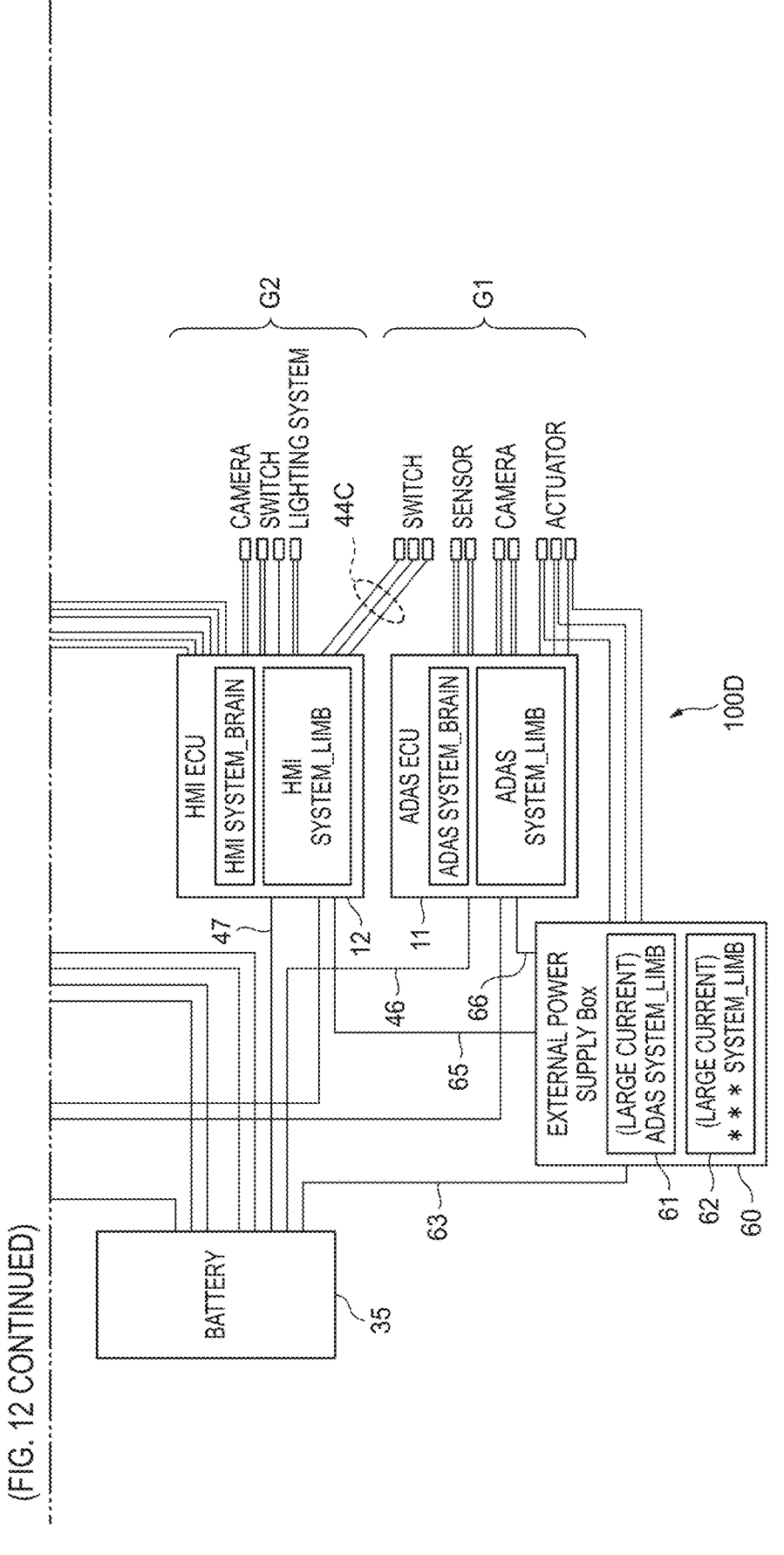

(FIG. 13 CONTINUED)
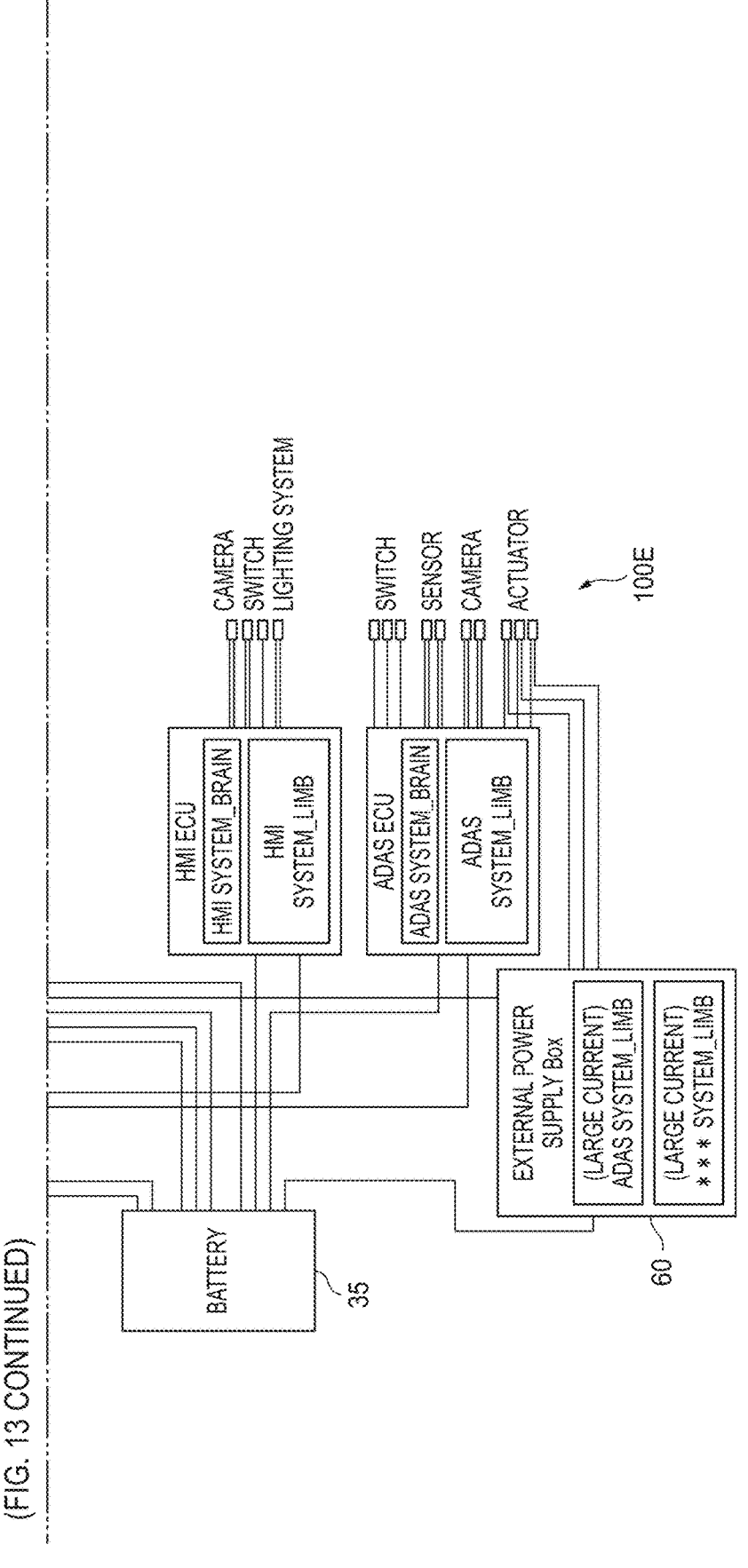

*FIG. 14*

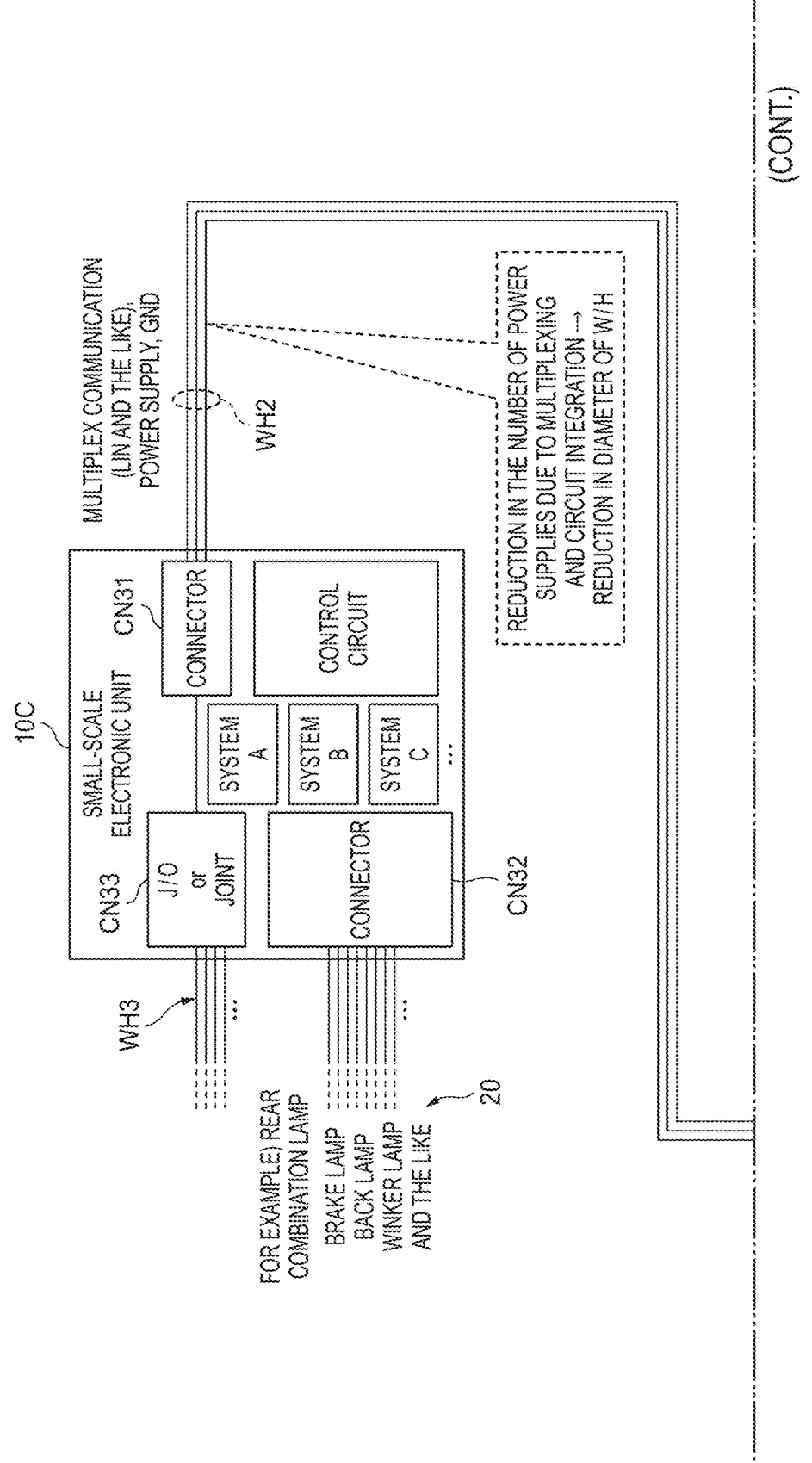

MULTIPLEX COMMUNICATION (LIN AND THE LIKE), POWER SUPPLY, GND

WH2

REDUCTION IN THE NUMBER OF POWER SUPPLIES DUE TO MULTIPLEXING AND CIRCUIT INTEGRATION → REDUCTION IN DIAMETER OF W/H

10C

SMALL-SCALE ELECTRONIC UNIT

CN31

CONNECTOR

CONTROL CIRCUIT

SYSTEM A

SYSTEM B

SYSTEM C

...

CN33

J/O or JOINT

CONNECTOR

CN32

WH3

...

FOR EXAMPLE) REAR COMBINATION LAMP

BRAKE LAMP
BACK LAMP
WINKER LAMP
AND THE LIKE

...

20

(CONT.)

(FIG. 14 CONTINUED)
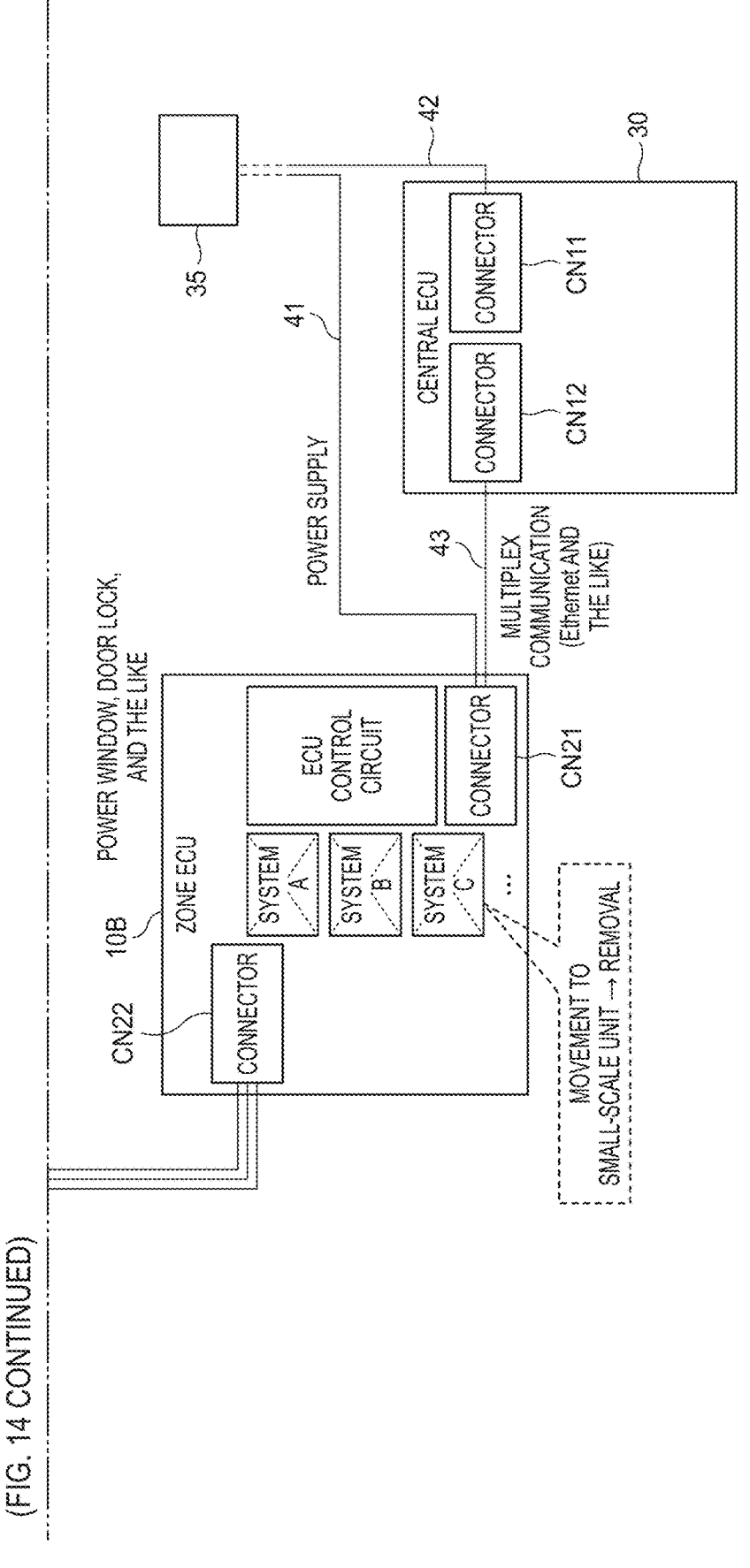

(FIG. 15 CONTINUED)
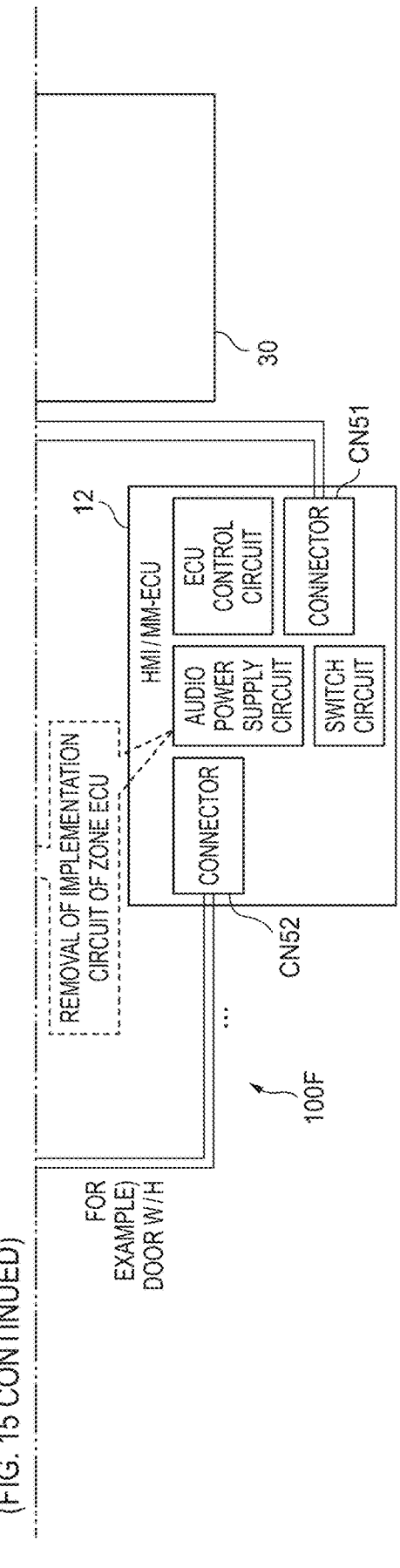

ONBOARD CONNECTION SYSTEM AND ONBOARD SYSTEM DESIGN METHOD

CROSS-REFERENCE TO RELATED APPLICATIONS

This is a continuation of International Application No. PCT/JP2023/005614 filed on Feb. 16, 2023, and claims priority from Japanese Patent Application No. 2022-031889 filed on Mar. 2, 2022, the entire content of which is incorporated herein by reference.

TECHNICAL FIELD

The present disclosure relates to an onboard connection system and an onboard system design method.

BACKGROUND ART

Generally, in a vehicle, onboard devices such as various types of electrical components are disposed in various portions of a vehicle body in a dispersed state. In addition, for example, a large number of independent electronic control units (ECUs) are mounted for each region of the vehicle body or each function. Further, a power supply such as an onboard battery and each electronic control unit are connected via a power supply line, and a plurality of electronic control units are connected via a signal line or a communication line. Further, the power supply line, the signal line, the communication line, and the like are normally included in a wire harness routed to each part of the vehicle body.

For example, FIGS. 1 and 2 of Patent Literature 1 show an onboard system that connects zone ECUs, a central processing unit, a battery, and a large number of devices.

Further, for example, FIG. 2 of Patent Literature 2 shows an onboard system that connects a central ECU, a plurality of zone ECUs, and various devices.

Further, for example, FIG. 1 of Patent Literature 3 shows an onboard system that connects a central gateway, a plurality of zone ECUs, and various devices.

CITATION LIST

Patent Literature

Patent Literature 1: JP2021-11231A
Patent Literature 2: JP2021-48477A
Patent Literature 3: JP2021-129278A

SUMMARY OF INVENTION

As disclosed in Patent Literatures 1 to 3, by disposing the zone ECU for each region of the vehicle, it is easy to intensively manage various devices on the vehicle for each region. In addition, since the zone ECU and the devices as control targets are present in the same region, the length of the wire harness connecting the zone ECU and the devices can be shortened. In addition, by intensively managing the plurality of zone ECUs by the central ECU, it is easy to perform communication between a plurality of regions and management of safe communication with the outside of the vehicle.

In addition, a system configuration is also conceivable in which a central ECU is provided with a function corresponding to a human brain, for example, advanced processes such as "recognition", "determination", and "instruction", and each zone ECU is provided with a control function corresponding to a human limb, for example, functions such as "detection", "report", and "operation according to an instruction".

Incidentally, in recent years, the number and types of functions that are provided as standard and the number and types of functions that are selectively provided as options on the vehicle tend to further increase. Therefore, each zone ECU and the central ECU tend to increase in size. Further, as the outer size of the entire wire harness connecting the onboard battery, the zone ECUs, and the central ECU increases, the number of electric wires included in the wire harness tends to increase, and a diameter of each electric wire such as a power supply line tends to increase.

Therefore, it may be difficult to secure a wide space required for providing the zone ECUs and the central ECU. For example, large-sized zone ECUs and a central ECU may compress a limited space in a vehicle cabin. Further, it is also difficult to secure a wide space required for routing the thick wire harness. In addition, since the thick wire harness is difficult to be bent, it is difficult to perform an attachment operation when the wire harness is routed on the vehicle.

Further, when the wire harness is designed for each vehicle, various trial and error studies may be performed on the system configuration, and optimization design work is often difficult.

The present disclosure has been made in view of the above circumstances, and an object of the present disclosure is to provide an onboard connection system and an onboard system design method that facilitate miniaturization of each zone ECU and reduction in diameter of a wire harness.

The above object according to the present disclosure is achieved by the following configuration.

An onboard connection system includes:

at least one zone ECU that is disposed in one region of partitioned regions on a vehicle and that controls a first device disposed in the same region;

at least one independent ECU that controls a second device independent of the control performed by the zone ECU without relation to the partition of the region in which the first device is disposed, the second device being disposed in one of the regions;

a central ECU that manages the zone ECU and the independent ECU, respectively;

a first power supply connection path that connects an onboard power supply and each of power supply inputs of the zone ECU and the central ECU; and a second power supply connection path that is a path independent of the first power supply connection path and that connects the onboard power supply and a power supply input of the independent ECU, wherein power supply electric power to the second device is supplied from the independent ECU.

An onboard system design method includes:

determining a plurality of regions formed by partitioning a space on a vehicle;

determining, regarding each of the regions, disposition of zone ECUs each of which controls all devices disposed in the corresponding region as control targets;

determining disposition of a central ECU having a function of integrally managing a plurality of the zone ECUs;

determining, regarding each of the plurality of regions, a routing path of a first connection circuit that connects each of all the devices disposed in the corresponding region to the corresponding zone ECU;

selectively extracting, as an independent function, a function separable from the control targets of the zone ECU among the devices in each of the plurality of regions;

determining an independent ECU that controls the independent function as a control target;

separating a power supply connection path at a portion corresponding to the independent function assigned to the independent ECU in the first connection circuit from the zone ECU and transferring the power supply connection path to the independent ECU; and reflecting a situation after the transferring of the power supply connection path and optimizing a configuration of a power supply connection circuit in at least a part of a wire harness.

According to the onboard connection system and the onboard system design method of the present disclosure, the miniaturization of each zone ECU and the reduction in diameter of the wire harness are facilitated.

The present disclosure has been briefly described above. Further, details of the present disclosure can be clarified by reading a mode (hereinafter, referred to as "embodiment") for carrying out the disclosure to be described below with reference to the accompanying drawings.

BRIEF DESCRIPTION OF DRAWINGS

FIG. 5 is a block diagram illustrating an overview of a power supply connection system in an onboard connection system according to an embodiment of the present disclosure;

FIG. 13 is a block diagram illustrating a modification of the onboard connection system illustrated in FIG. 8;

FIG. 14 is a block diagram illustrating a modification at the vicinity of a zone ECU included in the onboard connection system.

DESCRIPTION OF EMBODIMENTS

A specific embodiment according to the present disclosure will be described below with reference to the drawings.
<Basic Configuration of Onboard Connection System>

Configuration Example-1

Figure 1:
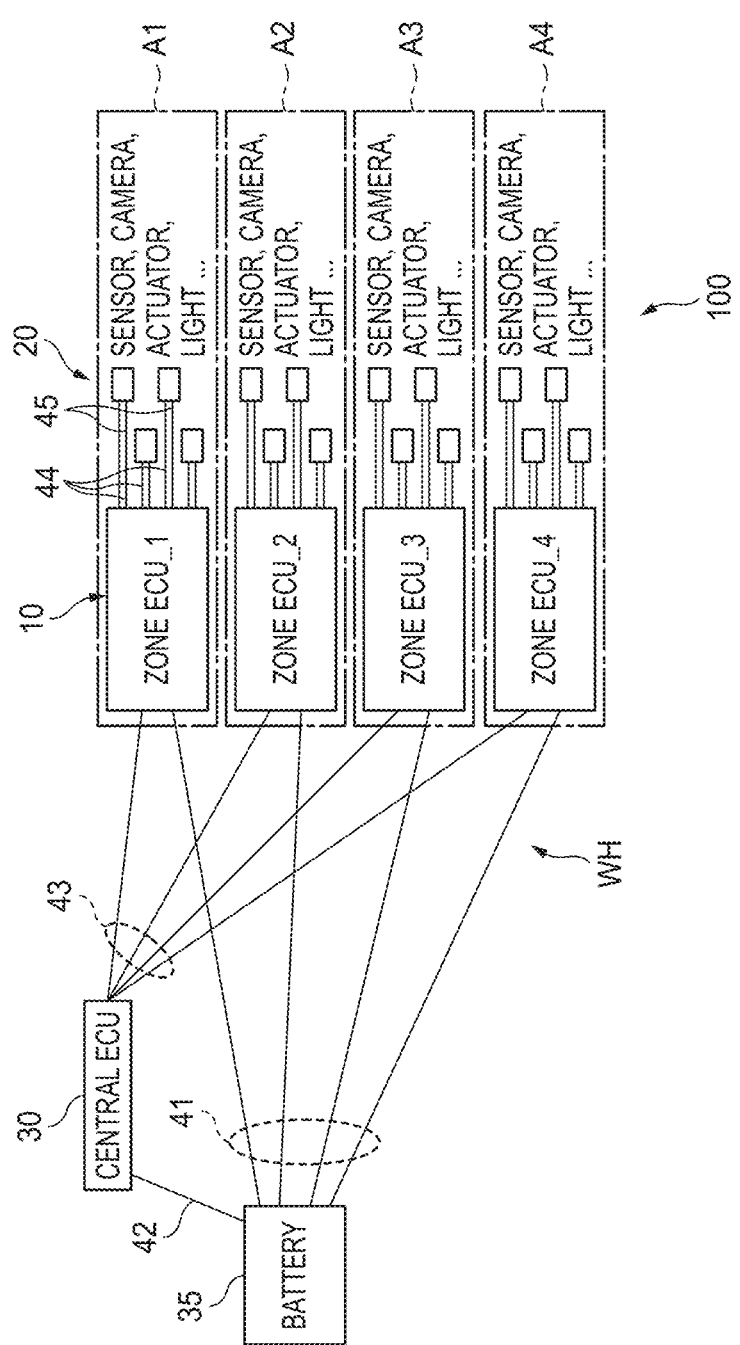
FIG. 1 is a block diagram illustrating an onboard connection system having a basic configuration.

FIG. 1 is a block diagram illustrating an onboard connection system 100 having a basic configuration.

A vehicle equipped with the onboard connection system 100 illustrated in FIG. 1 has a plurality of regions A1, A2, A3, and A4 that are partitioned in advance. As a specific example, the regions A1 to A4 are respectively assigned to a region at the right half and a region at the left half of the vehicle, a region near an instrument panel, a region near a luggage compartment, a region in an engine room, and the like.

On the other hand, a large number of onboard devices having various functions, that is, a large number of electrical components 20 as auxiliary devices are provided in various portions on the vehicle. Various sensors, cameras, actuators, lighting devices, and the like are generally included in these electrical components 20.

In the configuration illustrated in FIG. 1, one zone ECU 10 is disposed inside each of the regions A1 to A4 of the vehicle. The zone ECU 10 disposed in the region A1 is configured to have a function of controlling all the electrical components 20 disposed in the region A1. Similarly, the zone ECU 10 disposed in the region A2 is configured to have a function of controlling all the electrical components 20 disposed in the region A2. The zone ECU 10 disposed in the region A3 have a function of controlling all the electrical components 20 disposed in the region A3. The zone ECU 10 disposed in the region A4 is configured to have a function of controlling all the electrical components 20 disposed in the region A4.

Further, the onboard connection system 100 includes a central ECU 30. The central ECU 30 has a function of integrally managing control of the zone ECUs 10 and the electrical components 20 disposed in all the regions A1 to A4 on the vehicle. Further, conceptually, the function of the central ECU 30 is assumed to correspond to a function corresponding to a human brain, that is, a function of performing an upper-level process such as "recognition", "determination", and "instruction".

On the other hand, conceptually, the zone ECU 10 disposed in each of the regions A1 to A4 has a function required for controlling a portion corresponding to a human limb in each region, that is, a function such as "detection", "report", and "operation according to an instruction".

Therefore, the zone ECUs 10 disposed in the regions A1 to A4 and the central ECU 30 are connected by independent signal paths 43 so that signals and information can be transmitted via the signal paths 43.

Further, a downstream side of the zone ECU 10 in the region A1 is connected to the various electrical components 20 disposed in the region A1 via signal paths 44. Similarly, the downstream side of the zone ECU 10 in the region A2 is connected to the various electrical components 20 disposed in the region A2 via the signal paths 44. The downstream side of the zone ECU 10 in the region A3 is connected to the various electrical components 20 disposed in the region A3 via the signal paths 44. The downstream side of the zone ECU 10 in the region A4 is connected to the various electrical components 20 disposed in the region A4 via the signal paths 44.

On the other hand, electric circuits inside the zone ECUs 10 and the electrical components 20 in the regions A1 to A4, and inside the central ECU 30 require a supply of power supply electric power. Therefore, an output of an onboard battery 35 is electrically connected to power supply input terminals of the zone ECUs 10 in the regions A1 to A4 via independent power supply paths 41. Further, the output of the onboard battery 35 is electrically connected to a power supply input terminal of the central ECU 30 via a power supply path 42.

Further, a terminal on the downstream side of the zone ECU 10 disposed in the region A1 is electrically connected to power supply input terminals of the electrical components 20 in the region A1 via power supply paths 45. Similarly, the terminal on the downstream side of the zone ECU 10 disposed in the region A2 is electrically connected to the power supply input terminals of the electrical components 20 in the region A2 via the power supply paths 45. The terminal on the downstream side of the zone ECU 10 disposed in the region A3 is electrically connected to the power supply input terminals of the electrical components 20 in the region A3 via the power supply paths 45. The terminal on the downstream side of the zone ECU 10 disposed in the region A4 is electrically connected to the power supply input terminals of the electrical components 20 in the region A4 via the power supply paths 45.

Therefore, a wire harness WH, which is used for achieving the onboard connection system 100 of FIG. 1, needs to be provided with a large number of electric wires for individually and electrically connecting the power supply paths 41, the power supply path 42, the signal paths 43, and the signal paths 44 and the power supply paths 45 in each of the regions A1 to A4. In addition, regarding the electric wire used for each of the power supply paths 41, 42, and 45, it is necessary to adopt a relatively thick electric wire in consideration of the magnitude of a power supply current required for a corresponding load and a wiring length.

Configuration Example-2

Figure 2:
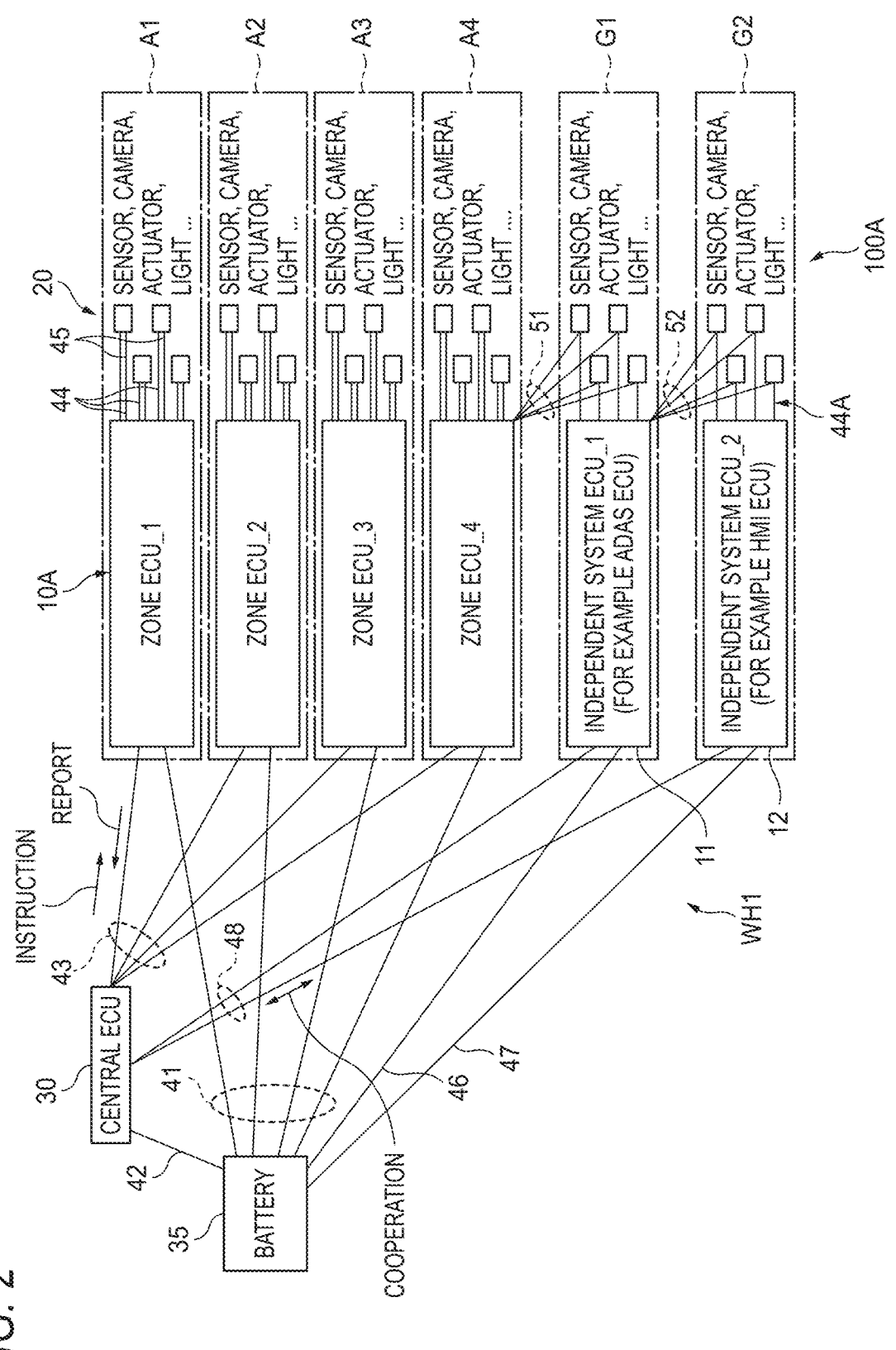
FIG. 2 is a block diagram illustrating an onboard connection system in which a part of the basic configuration is modified.
Figure 3:
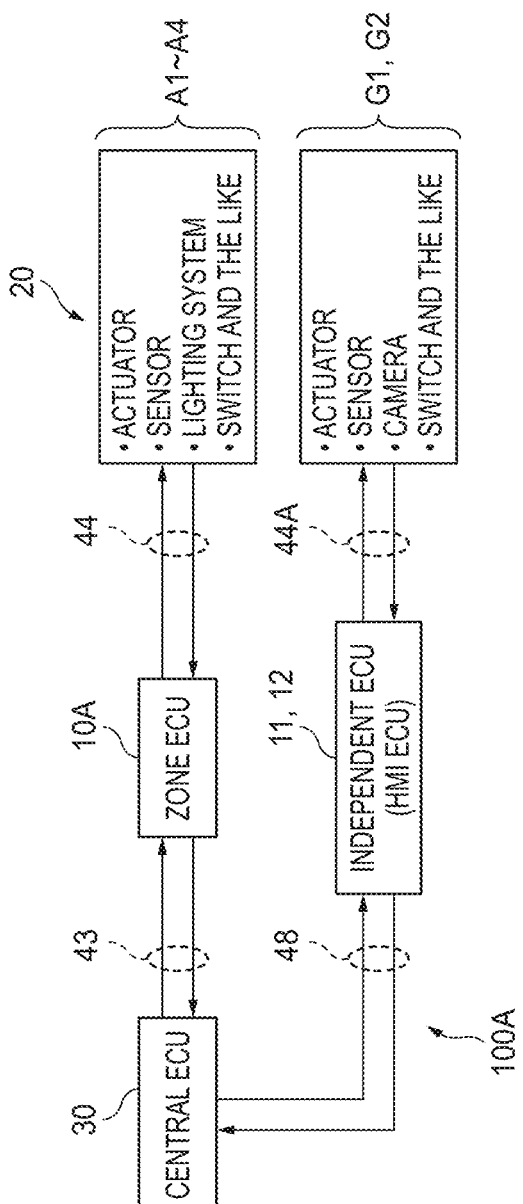
FIG. 3 is a block diagram illustrating an overview of a signal connection system in the onboard connection system of FIG. 2.
Figure 4:
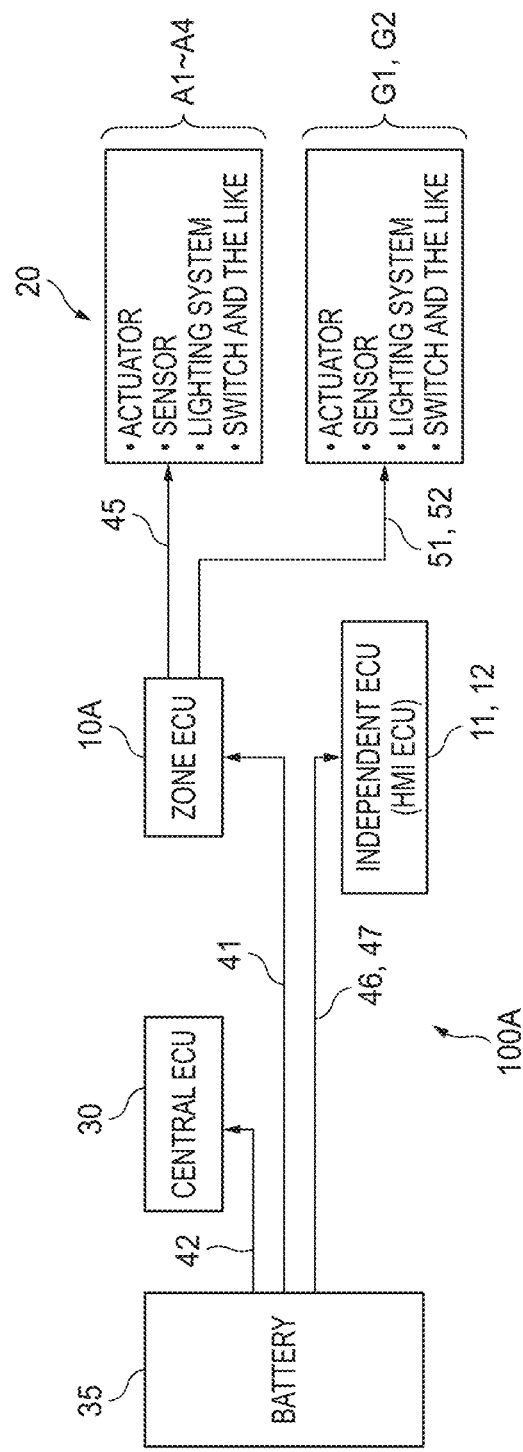
FIG. 4 is a block diagram illustrating an overview of a power supply connection system in the onboard connection system of FIG. 2.

FIG. 2 is a block diagram illustrating an onboard connection system 100A in which a part of the basic configuration illustrated in FIG. 1 is modified. FIG. 3 is a block diagram illustrating an overview of a signal connection system in the onboard connection system 100A of FIG. 2. FIG. 4 is a block diagram illustrating an overview of a power supply connection system in the onboard connection system 100A of FIG. 2.

In the configuration illustrated in FIGS. 2 to 4, regarding a partition in a case in which a large number of electrical components 20 are individually managed, in addition to differences in the regions A1 to A4 in which the electrical components 20 are disposed, two function groups G1 and G2 independent of the regions A1 to A4 are assigned for specific functions.

For example, even when the electrical components 20 belonging to the function group G1 are disposed in the region A2, the electrical components 20 are managed as the function group G1 without relation to the partition of the region A2. Further, for example, even when the electrical components 20 belonging to the function group G2 are disposed in the region A3, the electrical components 20 are managed as the function group G2 without relation to the partition of the region A3.

As a specific example, the electrical components 20 each having a function of advanced driver-assistance systems (ADAS) are prioritized in management as the function group G1 without relation to the regions A1 to A4 in which the electrical components 20 are disposed. In addition, the electrical components 20 each having a function of a human machine interface (HMI) are prioritized in management as the function group G2 without relation to the regions A1 to A4 in which the electrical components 20 are disposed.

Therefore, in addition to the zone ECUs 10, the onboard connection system 100A includes an independent ECU 11 having a function of controlling the electrical components 20 of the function group G1, and an independent ECU 12 having a function of controlling the electrical components 20 of the function group G2.

As illustrated in FIG. 2, a downstream side of the independent ECU 11 is connected to the electrical components 20 belonging to the function group G1 via signal paths 44A. Further, a downstream side of the independent ECU 12 is connected to the electrical component 20 belonging to the function group G2 via the signal paths 44A.

In addition, the central ECU 30 is connected to the independent ECUs 11 and 12 via signal paths 48 so that the central ECU 30 can individually manage the independent ECUs 11 and 12.

Further, a power supply input terminal of the independent ECU 11 is electrically connected to the onboard battery 35 via a power supply path 46, and a power supply input terminal of the independent ECU 12 is electrically connected to the onboard battery 35 via a power supply path 47.

Further, the power supply input terminal of each electrical component 20 belonging to the function group G1 is connected to, via a power supply path 51, the downstream side of the zone ECU 10 that manages the region in which the electrical component 20 is disposed. Similarly, the power supply input terminal of each electrical component 20 belonging to the function group G2 is connected to, via a power supply path 52, the downstream side of the zone ECU 10 that manages the region in which the electrical component 20 is disposed.

Therefore, in addition to elements of the wire harness WH illustrated in FIG. 1, a wire harness WH1, which is necessary for achieving the onboard connection system 100A illustrated in FIG. 2, needs to further include the power supply paths 46 and 47, the signal paths 48 and 44A, and the power supply paths 51 and 52.

The signal paths in the onboard connection system 100A of FIG. 2 are connected as illustrated in FIG. 3. That is, the central ECU 30 is connected to zone ECUs 10A in the regions A1 to A4 via the signal paths 43, and the central ECU 30 is connected to the independent ECUs 11 and 12 via the signal paths 48. Further, in each of the regions A1 to A4, the zone ECU 10A is connected to the electrical components 20 in the region via the signal paths 44. In addition, the electrical components 20 belonging to the function groups G1 and G2 are connected to the independent ECUs 11 and 12 via the signal paths 44A without relation to the regions A1 to A4 in a corresponding manner.

Therefore, each zone ECU 10A can control the electrical components 20 connected to the downstream side via the signal paths 44 or can input signals from the electrical components 20. Further, each of the independent ECUs 11 and 12 can control the electrical components 20 connected to the downstream side thereof via the signal paths 44A or can input the signals from the electrical components 20.

In addition, the central ECU 30 can input and output signals to and from the zone ECUs 10A in the regions A1 to A4 via the signal paths 43, and can manage the zone ECUs 10A and the electrical components 20 under the control of the zone ECUs 10A. Further, the central ECU 30 can input and output signals to and from the independent ECUs 11 and 12 of the function groups G1 and G2 via the signal paths 48, and can manage the independent ECUs 11 and 12 of the function groups G1 and G2 and the electrical components 20 under the control of the independent ECUs 11 and 12.

On the other hand, the power supply paths in the onboard connection system 100A are connected as illustrated in FIG. 4. The power supply electric power is supplied from the onboard battery 35 to the central ECU 30 via the power supply path 42. Further, the power supply electric power is supplied from the onboard battery 35 to the zone ECUs 10A in the regions A1 to A4 via the power supply paths 41. Further, the power supply electric power is supplied from the onboard battery 35 to the independent ECUs 11 and 12 via the power supply paths 46 and 47.

Further, the power supply electric power is supplied to the electrical components 20 in each of the regions A1 to A4 via the power supply paths 45. Further, the power supply electric power is supplied to the power supply input terminals of the electrical components 20 belonging to the function groups G1 and G2 from outputs of the zone ECUs 10A managing the same regions via the power supply paths 51 and 52.

In the case of the configuration of the onboard connection system 100A illustrated in FIGS. 2 to 4, a large number of electrical components 20 are particularly connected to the downstream side of the zone ECU 10A in each of the regions A1 to A4, and thus even when the independent ECUs 11 and 12 are provided, there is a concern that the zone ECUs 10A increase in size as the electrical components 20 increase in size. That is, since an internal circuit of each zone ECU 10A increases or the number of terminals of a connector increases, the size of a housing for the zone ECU 10A increases. In addition, the number of electric wires (the total number of electric wires for the power supply paths 45, 51, and 52) included in the wire harness connecting the zone ECU 10A and the electrical components 20 in each of the regions A1 to A4 increases, and the outer size of the wire harness increases.

DESCRIPTION OF EMBODIMENT

A specific embodiment according to the present disclosure will be described below with reference to the drawings.

Configuration Example-1

Figure 5:
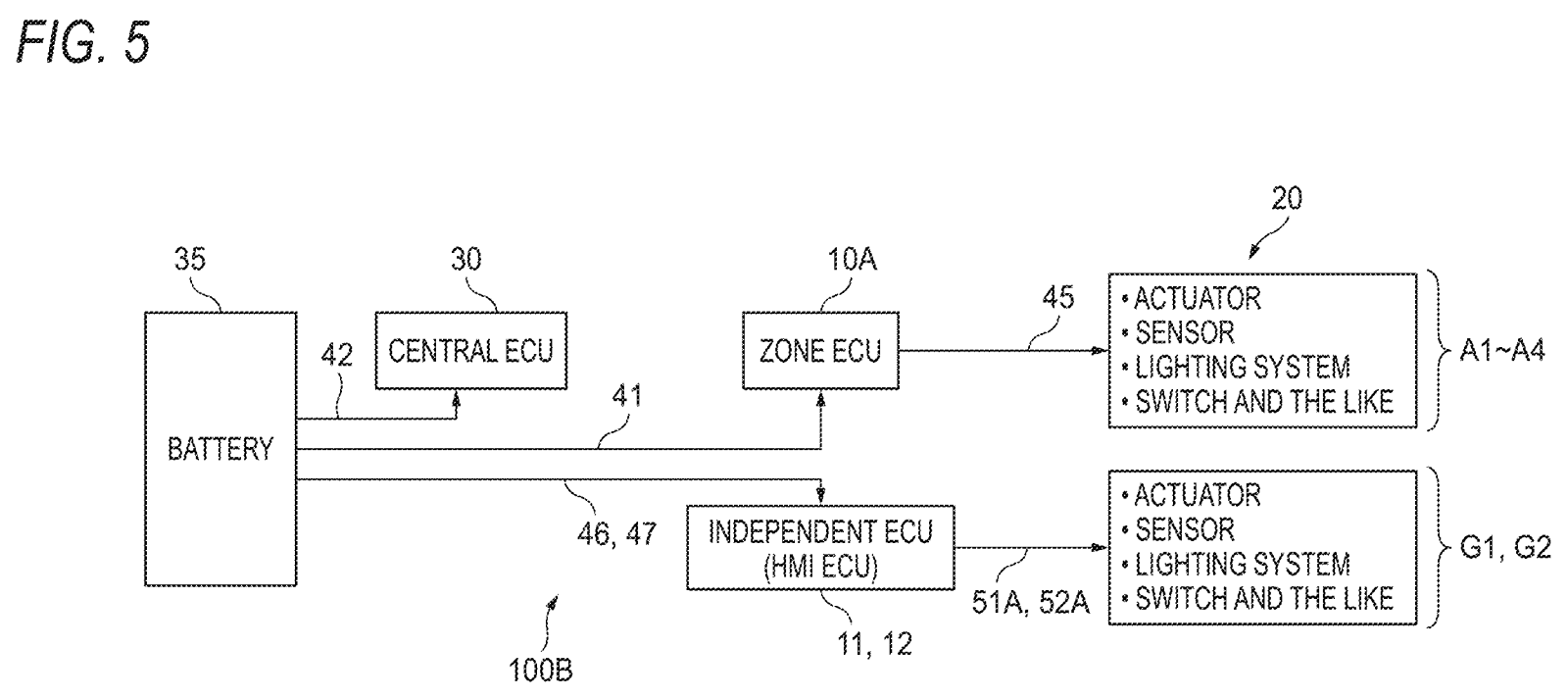
Figure 6:
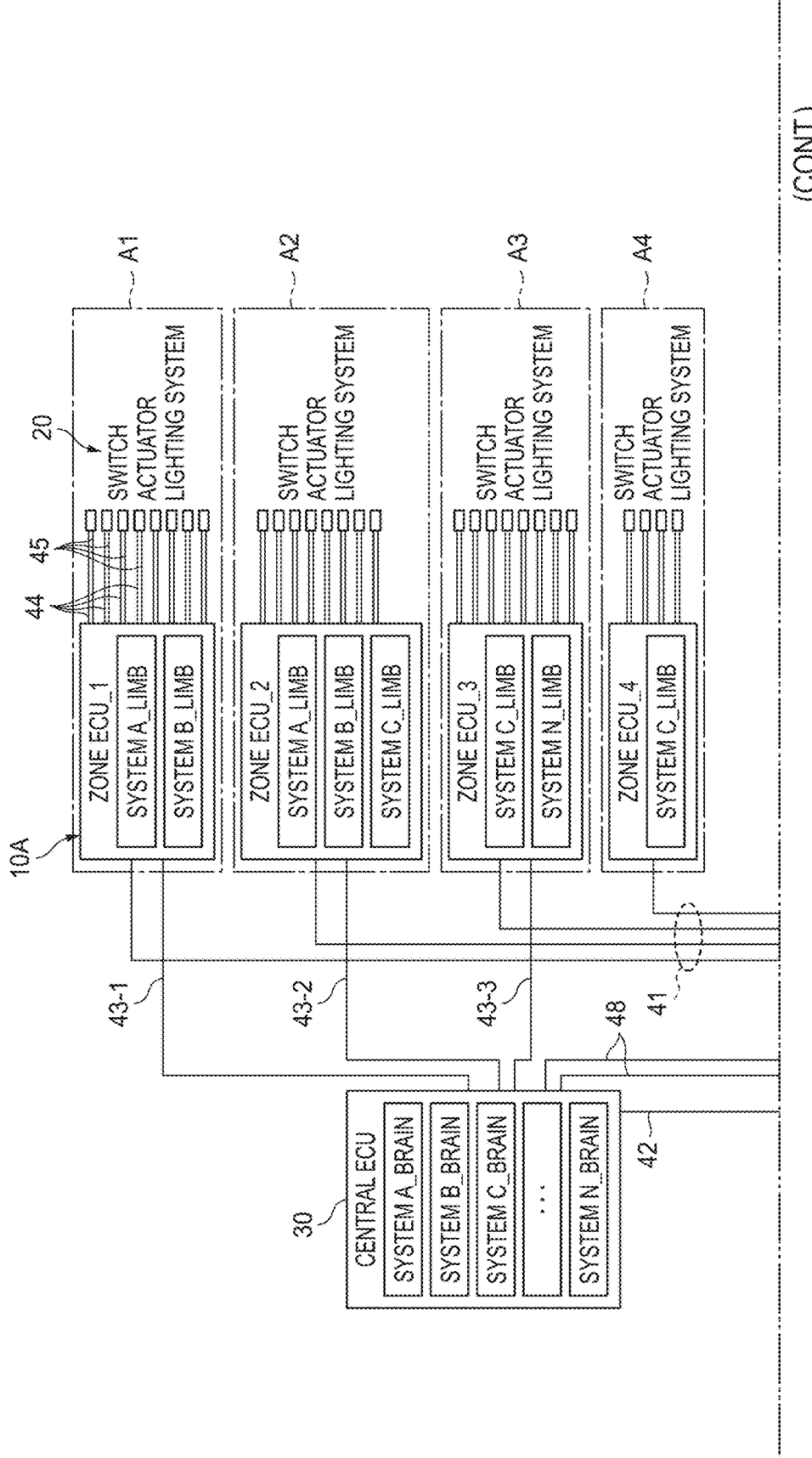
FIG. 6 is a block diagram illustrating a detailed configuration example of the same onboard connection system as that of FIG. 5.

FIG. 5 is a block diagram illustrating an overview of a power supply connection system in an onboard connection system 100B according to an embodiment of the present disclosure. FIG. 6 is a block diagram illustrating a detailed configuration example of the onboard connection system 100B as that of FIG. 5. A configuration of a signal connection system of the onboard connection system 100B is the same as that of the onboard connection system 100A illustrated in FIG. 2.

As illustrated in FIG. 6, the onboard connection system 100B includes the zone ECUs 10A disposed in the regions A1 to A4, the independent ECU 11 that controls the electrical components 20 in the function group G1, the independent ECU 12 that controls the electrical component 20 in the function group G2, and the central ECU 30 that integrally manages all the above.

The electrical components 20 disposed in the region A1 on the vehicle are connected to the downstream side of the zone ECU 10A disposed in the region A1 via a wire harness including the signal paths 44 and the power supply paths 45.

Similarly, the electrical components 20 disposed in the region A2 on the vehicle are connected to the downstream side of the zone ECU 10A disposed in the region A2 via the wire harness including the signal paths 44 and the power supply paths 45. The electrical components 20 disposed in the region A3 on the vehicle are connected to the downstream side of the zone ECU 10A disposed in the region A3 via the wire harness including the signal paths 44 and the power supply paths 45. The electrical components 20 disposed in the region A4 on the vehicle are connected to the downstream side of the zone ECU 10A disposed in the region A4 via the wire harness including the signal paths 44 and the power supply paths 45.

In the example of FIG. 6, the zone ECU 10A in the region A1 includes a control function corresponding to a limb of a system A and a control function corresponding to a limb of a system B. In addition, the zone ECU 10A in the region A2 includes the control function corresponding to the limb of the system A, the control function corresponding to the limb of the system B, and a control function corresponding to a limb of a system C. The zone ECU 10A in the region A3 includes the control function corresponding to the limb of the system A and a control function corresponding to a limb of a system N. The zone ECU 10A in the region A4 includes the control function corresponding to the limb of the system C.

On the other hand, the electrical components 20 included in the function group G1 are controlled by the independent ECU 11 without relation to the partition of the regions A1 to A4 in which the electrical components 20 are disposed. Further, the electrical components 20 included in the function group G1 are connected to the downstream side of the independent ECU 11 via the wire harness including the signal paths 44A and power supply paths 51A.

In addition, the electrical components 20 included in the function group G2 are controlled by the independent ECU 12 without relation to the partition of the regions A1 to A4 in which the electrical components 20 are disposed. Further, the electrical components 20 included in the function group G2 are connected to the downstream side of the independent ECU 12 via the wire harness including the signal paths 44A and power supply paths 52A.

In the example of FIG. 6, the independent ECU 11 includes a control function corresponding to a brain of an ADAS system and a control function corresponding to a limb of the ADAS system. Further, the independent ECU 12 includes a control function corresponding to a brain of an HMI system and a control function corresponding to a limb of the HMI system.

The central ECU 30 is provided with control functions corresponding to respective brains of the system A, the system B, the system C, . . . , and the system N.

The central ECU 30 is connected to the zone ECUs 10A in the regions A1 to A3 via the wire harness including signal paths 43-1, 43-2, and 43-3 (the signal paths 43). Further, the independent ECUs 11 and 12 are connected to the central ECU 30 via the wire harness including the signal paths 48.

Each of the signal paths 43 and 48 is implemented by a signal line that allows transmission of a simple signal, a controller area network (CAN), a local interconnect network (LIN), or a communication line that allows signal transmission through a multiplex communication network such as Ethernet (registered trademark).

Therefore, the central ECU 30 can manage the zone ECUs 10A in the regions A1 to A3 or can share information and the like with the independent ECUs 11 and 12.

On the other hand, power supply input terminals of the zone ECUs 10A in the regions A1 to A4 are connected to the output of the onboard battery 35 via the independent power supply paths 41. In addition, the power supply input terminals of the central ECU 30 and the independent ECUs 11 and 12 are connected to the output of the onboard battery 35 via the power supply paths 42, 46, and 47, respectively.

Therefore, control units of the zone ECUs 10A in the regions A1 to A4, the independent ECUs 11 and 12, and the central ECU 30 can operate by the power supply electric power supplied from the onboard battery 35.

As illustrated in FIG. 5, among the electrical components 20 disposed in each of the regions A1 to A4, the electrical components 20 not belonging to the function groups G1 and G2 are connected to the downstream side of the zone ECU 10A via the power supply paths 45. Therefore, these electrical components 20 can operate by the power supply electric power supplied from the zone ECU 10A in the same region.

On the other hand, the electrical components 20 belonging to the function group G1 are connected to an output of the independent ECU 11 via the power supply paths 51A without relation to the partition of the regions A1 to A4 in which the electrical components 20 are disposed. In addition, the electrical components 20 belonging to the function group G2 are connected to an output of the independent ECU 12 via the power supply paths 52A without relation to the partition of the regions A1 to A4 in which the electrical components 20 are disposed.

The electrical components 20 of the function group G1 can operate by the power supply electric power supplied from the output of the independent ECU 11. In addition, the electrical components 20 of the function group G2 can operate by the power supply electric power supplied from the output of the independent ECU 12.

Further, the electrical components 20 other than the electrical components 20 of the function groups G1 and G2 can operate by the power supply electric power supplied from the zone ECU 10A disposed in the same partitioned region among the regions A1 to A4 in which the electrical components 20 are disposed.

That is, in the onboard connection system 100B of FIG. 5, routing paths of the power supply paths 51A and 52A are significantly different from those of the power supply paths 51 and 52 of the onboard connection system 100A of FIG. 4. Due to this difference in the configuration, when the total number and types of the electrical components 20 increase, the miniaturization of the zone ECUs 10A in the regions A1 to A4 and the reduction in diameter of the wire harness connected to the downstream sides of the zone ECUs 10A are facilitated.

<Onboard System Design Method>

Figure 7:
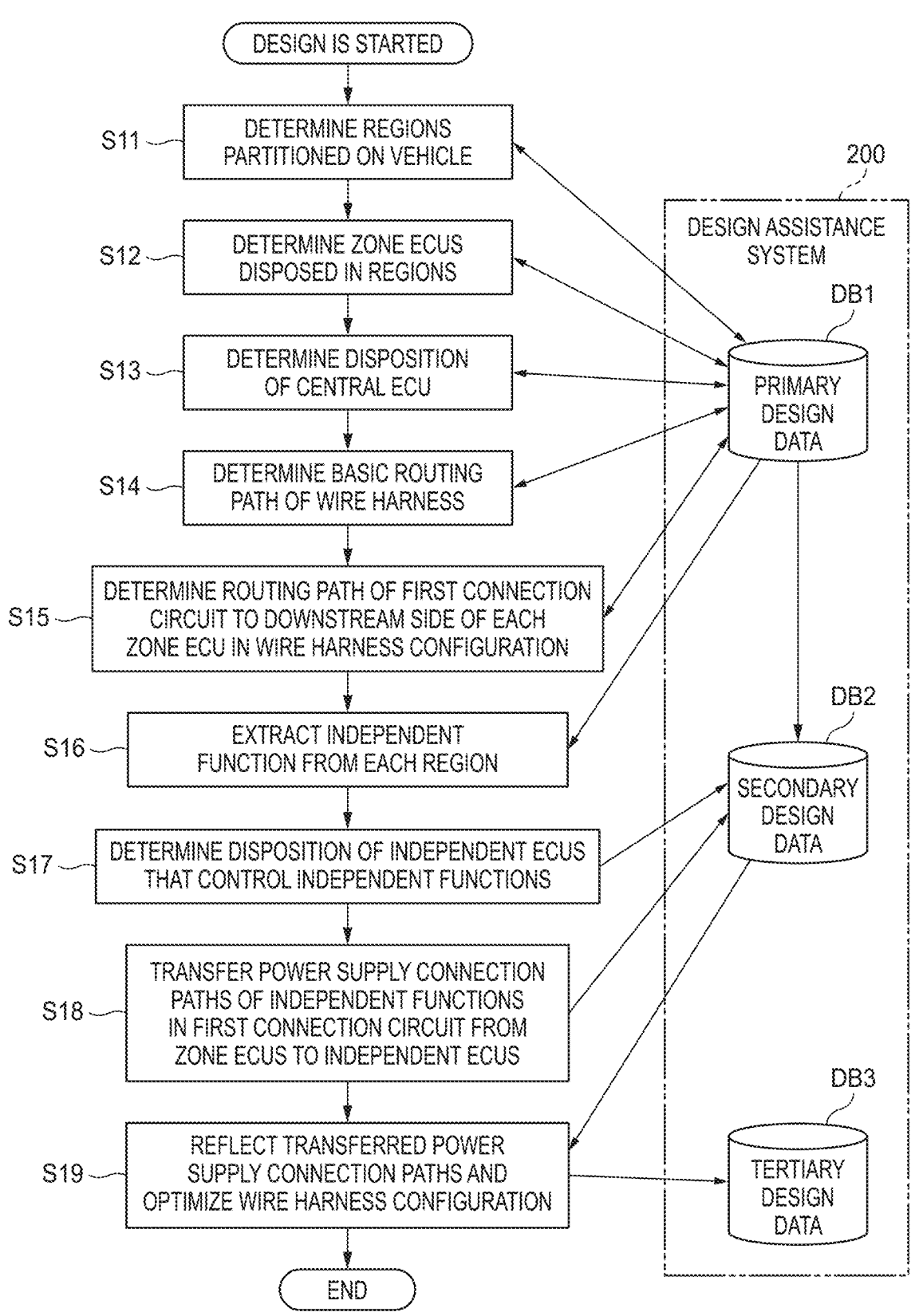
FIG. 7 is a flowchart illustrating processing procedures of an onboard system design method according to the embodiment of the present disclosure.

FIG. 7 is a flowchart illustrating processing procedures of an onboard system design method according to the embodiment of the present disclosure. By designing the wire harness according to the processing procedures illustrated in FIG. 7, it is possible to relatively easily design a wire harness having an appropriate configuration that can be used in the onboard connection system 100B illustrated in FIGS. 5 and 6.

In the example illustrated in FIG. 7, it is assumed that a designer performs design work while performing various input operations by using a computer system including a design assistance system 200. Such a design assistance system 200 can assist the design work by the designer based on information such as data such as shapes and sizes of respective parts of the vehicle provided with the wire harness, positions at which the various electrical components provided on the vehicle are provided, and various specifications for the electrical components. There is also a possibility that a computer of the design assistance system 200 can automate the design work performed by the designer.

The processing procedures in FIG. 7 will be described below. An order of executing processes illustrated in FIG. 7 can be changed as necessary.

The designer operates the design assistance system 200 to determine a plurality of regions partitioned on a target vehicle in S11. Therefore, for example, each of the regions A1 to A4 in FIGS. 1 and 6 is determined. Specifically, the region on the right side and the region on the left side of the vehicle, the region near the instrument panel, the region near the luggage compartment, the region in the engine room, and the like are specified. In the example of FIG. 7, information on the plurality of regions determined in S11 is held in a data holding unit DB1 as a part of primary design data.

In S12, the designer operates the design assistance system 200 to determine the zone ECUs 10 disposed in the regions determined in S11. For example, as in the onboard connection system 100 illustrated in FIG. 1, one zone ECU 10 is disposed in a range of each of the regions A1 to A4. In the example of FIG. 7, information on the zone ECUs 10 in the regions determined in S12 is held in the data holding unit DB1 as a part of the primary design data.

The designer operates the design assistance system 200 to determine the disposition of the central ECU 30 in S13. In the example of FIG. 7, information on the disposition of the central ECU 30 determined in S13 is held in the data holding unit DB1 as a part of the primary design data.

The designer operates the design assistance system 200 to determine a basic routing path of the wire harness in S14. For example, regarding the wire harness including the power supply paths 41 and 42 and the signal paths 43 illustrated in FIG. 1, connection positions at both ends, an electric wire length, a path to be passed, and the like are determined for each electric wire. In the example of FIG. 7, information on the basic routing path determined in S14 is held in the data holding unit DB1 as a part of the primary design data.

In S15, the designer operates the design assistance system 200 to determine a routing path of a "first connection circuit" necessary for connecting the electrical components 20 to the downstream side of the zone ECU 10 in each of the regions A1 to A4 in a wire harness configuration. For example, the signal paths 44 and the power supply paths 45 in each of the regions A1 to A4 illustrated in FIG. 1 correspond to the first connection circuit. In the example of FIG. 7, information on the routing path of the first connection circuit determined in S15 is held in the data holding unit DB1 as a part of the primary design data.

For example, in order to improve the configuration of the onboard connection system 100 illustrated in FIG. 1, the designer operates the design assistance system 200 to selectively extract, from the primary design data, an independent function from each of the regions A1 to A4 in S16. As a representative example, it is assumed that the electrical components 20 each having the function of the advanced driver-assistance systems (ADAS) are extracted as the function group G1 from all the regions A1 to A4, and the electrical components 20 each having the function of the human machine interface (HMI) are extracted as the function group G2 from all the regions A1 to A4.

In S17, the designer operates the design assistance system 200 to determine the disposition of the independent ECUs 11 and 12 that control the independent functions extracted in S16. In the example of FIG. 7, information on the disposition of the independent ECUs 11 and 12 determined in S16 is held in a data holding unit DB2 as a part of secondary design data.

In S18, the designer operates the design assistance system 200 to transfer power supply connection paths of the independent functions extracted in S16 in the "first connection circuit" included in the wire harness of the primary design data in the data holding unit DB1 from the zone ECUs 10 in the primary design data to the independent ECUs 11 and 12 in the secondary design data. Accordingly, for example, the routing paths of the power supply paths 51 and 52 in the "first connection circuit" illustrated in FIG. 4 are changed to those of the power supply paths 51A and 52A illustrated in FIG. 5.

As a result of the process in S18, the secondary design data is generated from the primary design data in the data holding unit DB1 and is held in the data holding unit DB2. Accordingly, data representing a configuration of the wire harness (the wire harness in the onboard connection system 100B of FIGS. 5 and 6), which is obtained after a part of the routing paths of the "first connection circuit" in the configuration of the wire harness in the primary design data is changed, is obtained.

In order to optimize the configuration of the wire harness by reflecting a result of transferring the power supply connection paths in S18, the designer operates the design assistance system 200 to generate optimized tertiary design data from the secondary design data in the data holding unit DB2 in S19.

For example, since the power supply paths 51 and 52 in FIG. 4 are changed to the power supply paths 51A and 52A in FIG. 5 by the transferring in S18, the power supply paths 51 and 52, which become unnecessary on the downstream sides of the zones ECU 10A, are deleted from the configuration of the wire harness in S19. In addition, since unnecessary portions are generated in the internal circuits of the zone ECUs 10A and terminals of wire harness connecting connectors due to the deletion of the power supply paths 51 and 52, the number of terminals of the connectors is reduced, or each connector itself is replaced with a small component. In addition, an unnecessary circuit in each zone ECU 10A is deleted to miniaturize the zone ECU 10A. In addition, since the number of remaining electric wires of the wire harness after the power supply paths 51 and 52 are deleted is reduced, the configuration can be changed to a further optimum state by changing a routing path or a branch position of the wire harness or shortening the electric wire length. Further, it is also conceivable to change a specification of an exterior material of the wire harness.

The generated tertiary design data is held in a data holding unit DB3. Based on the tertiary design data, a wire harness having an appropriate configuration that can be adopted in the onboard connection system 100B illustrated in FIGS. 5 and 6 can be manufactured.

Configuration Example-2

Figure 8:
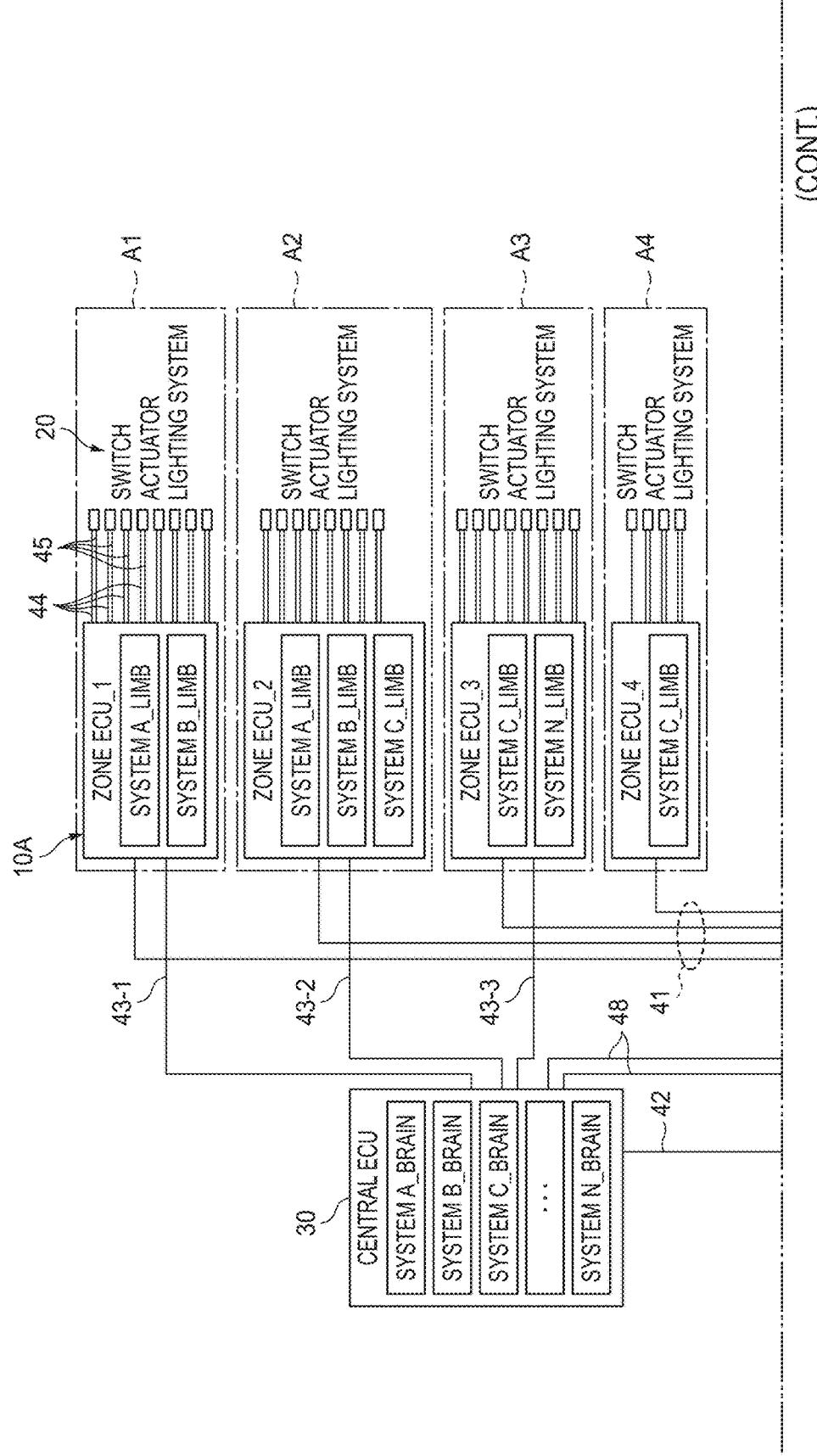
FIG. 8 is a block diagram illustrating a modification of the onboard connection system of FIG. 6.
Figure 9:
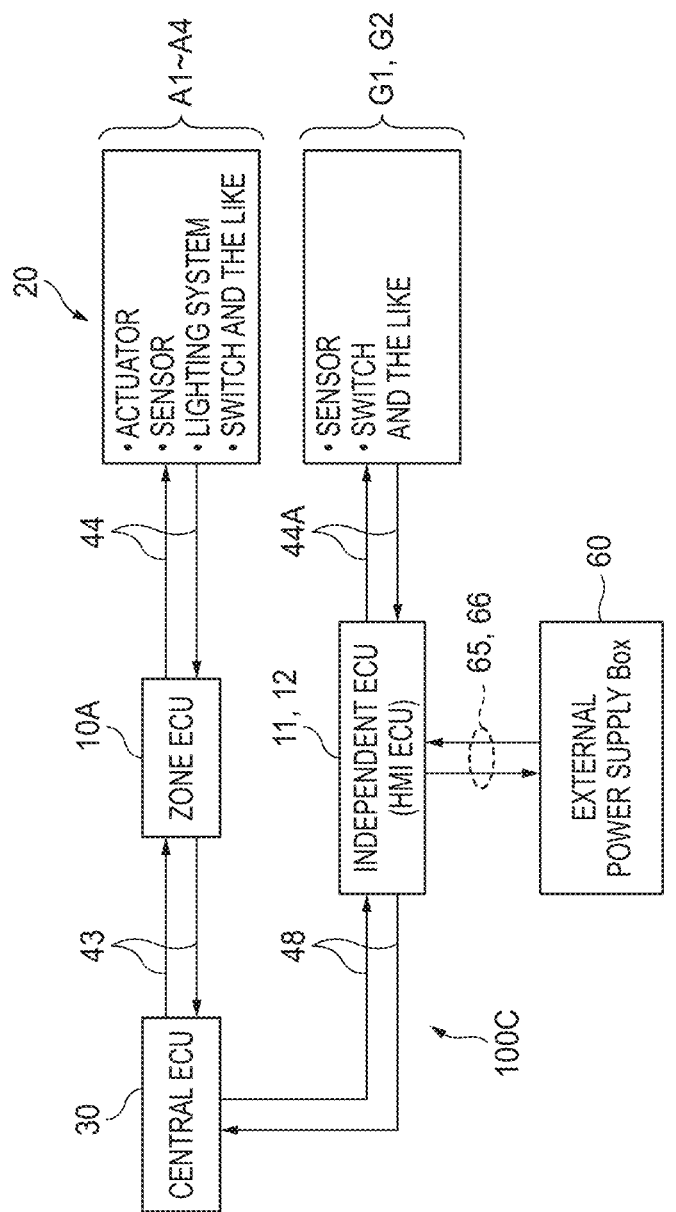
FIG. 9 is a block diagram illustrating an overview of a signal connection system in an onboard connection system of FIG. 8.
Figure 10:
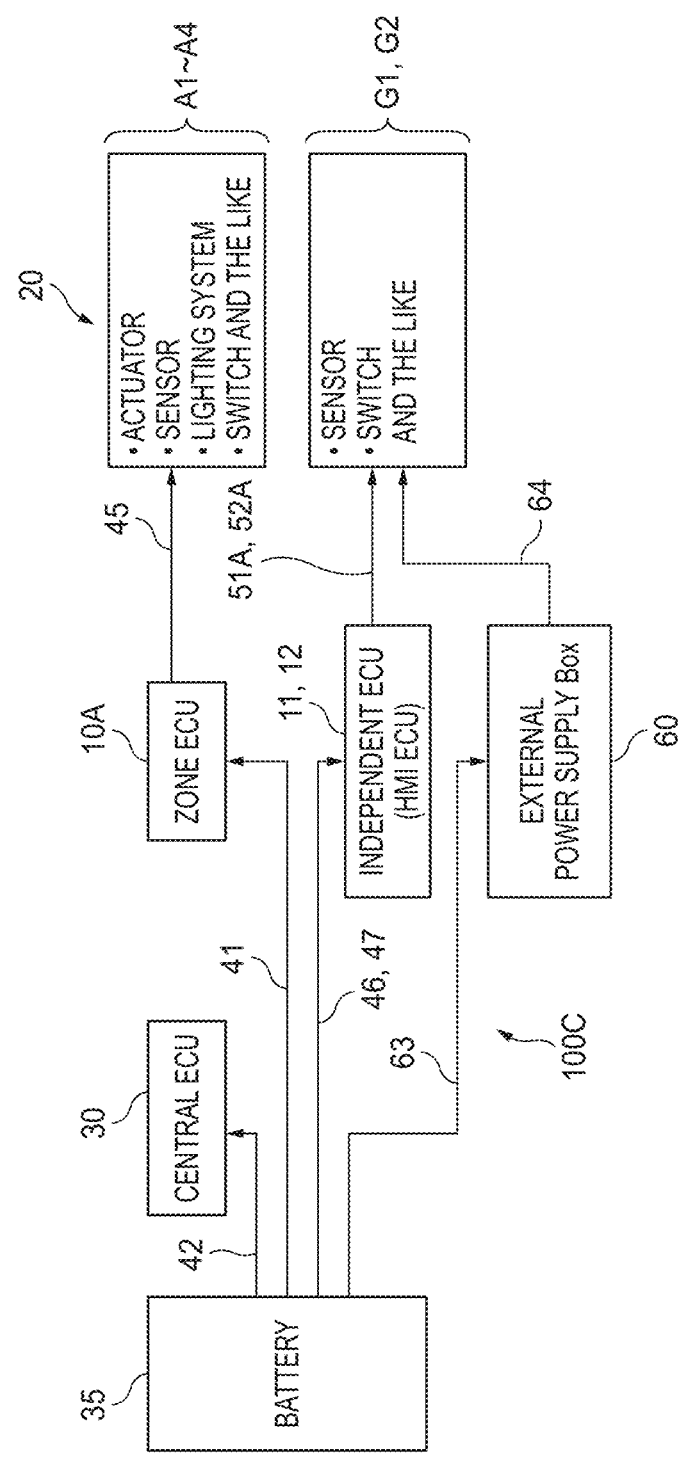
FIG. 10 is a block diagram illustrating an overview of a power supply connection system in the onboard connection system of FIG. 8.

FIG. 8 is a block diagram illustrating a modification of the onboard connection system 100B of FIG. 6. FIG. 9 is a block diagram illustrating an overview of a signal connection system in an onboard connection system 100C of FIG. 8. FIG. 10 is a block diagram illustrating an overview of a power supply connection system in the onboard connection system 100C of FIG. 8.

The onboard connection system 100C illustrated in FIGS. 8 to 10 includes an external power supply box 60 in addition to the zone ECUs 10A, the central ECU 30, the independent ECUs 11 and 12 described above. The added external power supply box 60 is provided with, as large current control units 61 and 62, functions for a supply of the power supply electric power to a load consuming a large current and control corresponding to a limb.

In the example illustrated in FIGS. 8 to 10, a supply of the power supply electric power to a part of loads each consuming a large current in the electrical components 20 included in the function group G1 or G2 is configured to be performed by the external power supply box 60 instead of the independent ECUs 11 and 12.

When a power supply circuit handles a large current, a space required for disposing the power supply circuit is increased, and a heat generation measure and a noise measure are also required. Therefore, when the loads consuming a large current are connected to the independent ECUs 11 and 12, a burden on each of the independent ECUs 11 and 12 may increase.

Therefore, in the onboard connection system 100C illustrated in FIGS. 8 to 10, in order to reduce the burden on each of the independent ECUs 11 and 12, the external power supply box 60 disposed outside the independent ECUs 11 and 12 is used.

A power supply input terminal of the external power supply box 60 is connected to the output of the onboard battery 35 via a power supply path 63. In addition, the external power supply box 60 is connected to the independent ECU 11 via a signal path 66, and the external power supply box 60 is connected to the independent ECU 12 via a signal path 65.

In addition, in the example illustrated in FIG. 8, actuators (a part of the loads in the electrical components 20) each consuming a large current in the function group G1 are connected to an output of the external power supply box 60 via power supply paths 64.

Therefore, even when a part of the electrical components 20 in the function group G1 consumes a large current, no large current flows through an internal circuit of the independent ECU 11, and the burden on the independent ECU 11 can be reduced.

Configuration Example-3

Figure 11:
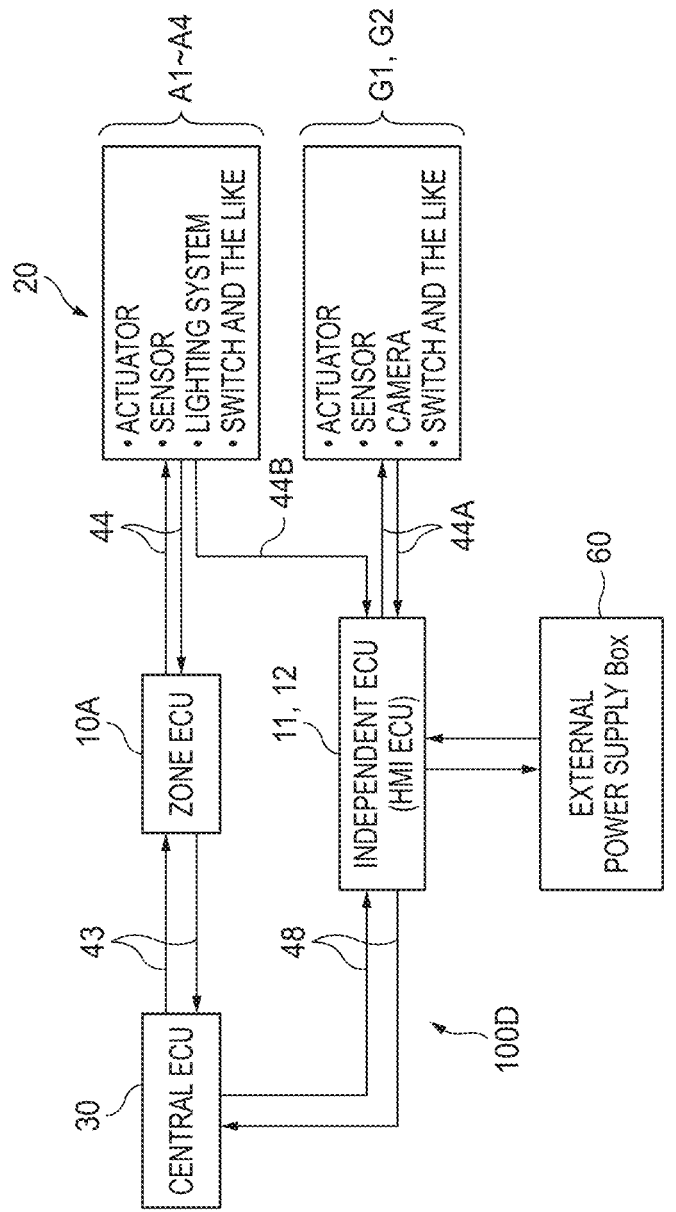
FIG. 11 is a block diagram illustrating a modification of the signal connection system of the onboard connection system illustrated in FIG. 9.
Figure 12:
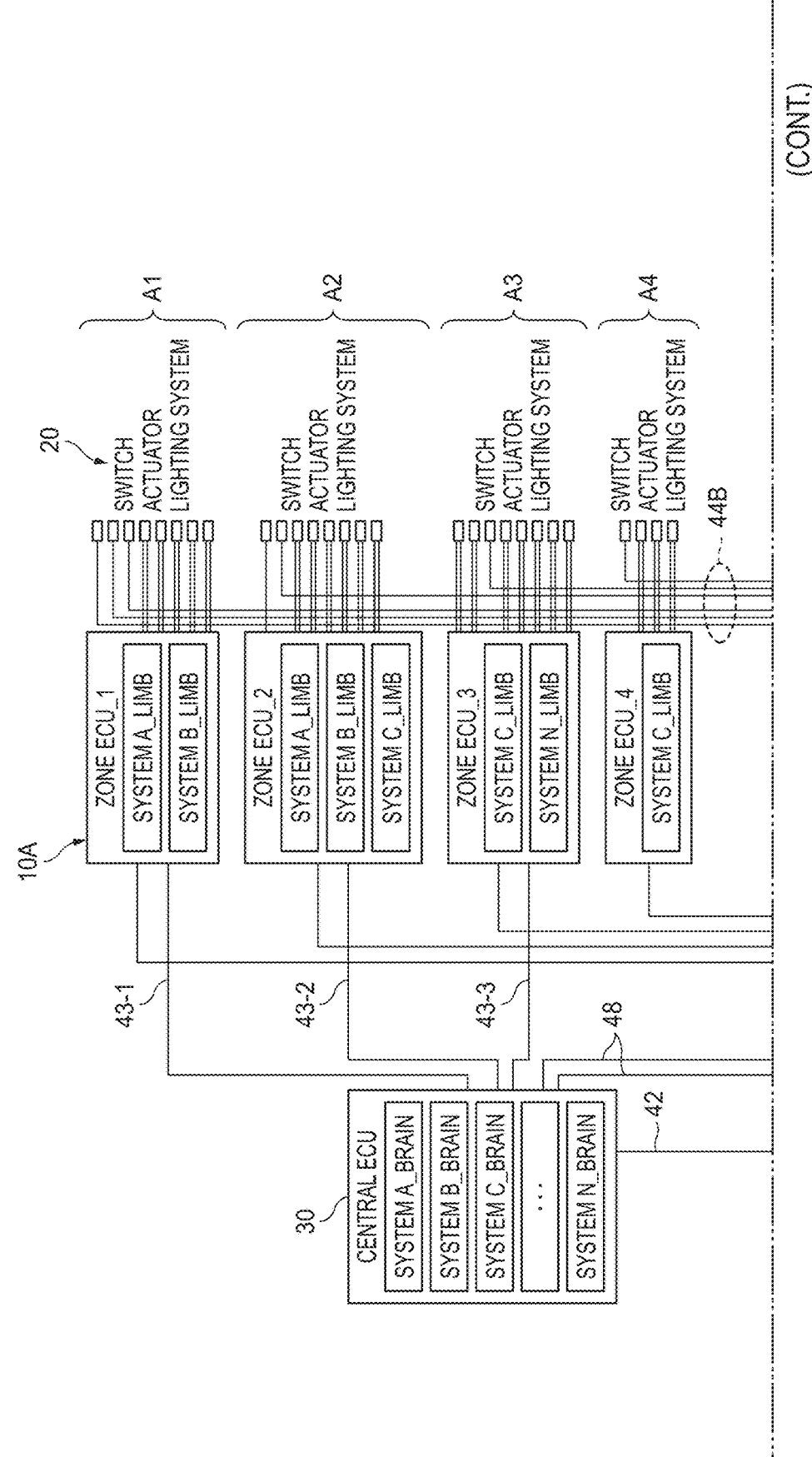
FIG. 12 is a block diagram illustrating a specific onboard connection system including the signal connection system illustrated in FIG. 11.

FIG. 11 is a block diagram illustrating a modification of the signal connection system of the onboard connection system illustrated in FIG. 9. FIG. 12 is a block diagram illustrating a specific onboard connection system 100D including the signal connection system illustrated in FIG. 11.

In the configuration illustrated in FIG. 9, all the electrical components 20 disposed in each of the regions A1 to A4 are connected to the downstream side of the zone ECU 10A disposed in the same region via the wire harness. On the other hand, in the onboard connection system 100D illustrated in FIGS. 11 and 12, only signals of switches among a large number of electrical components 20 disposed in the regions A1 to A4 are connected to the downstream side of the independent ECU 12 via the wire harness including signal paths 44B.

Further, in the example of FIG. 12, only signals of switches among the electrical components 20 included in the function group G1 are connected to the downstream side of the independent ECU 12 via the wire harness including signal paths 44C.

In the configuration illustrated in FIG. 12, the signals of a large number of switches disposed in various places on the vehicle can be intensively monitored by the independent ECU 12. The independent ECU 12 can read the signals of a large number of switches and can transmit information indicating a state of each switch to the central ECU 30 via the signal path 48. The central ECU 30 can notify the zone ECUs 10A in the regions A1 to A4 and the independent ECU 11 of the information indicating the state of each switch received from the independent ECU 12.

Configuration Example-4

Figure 13:
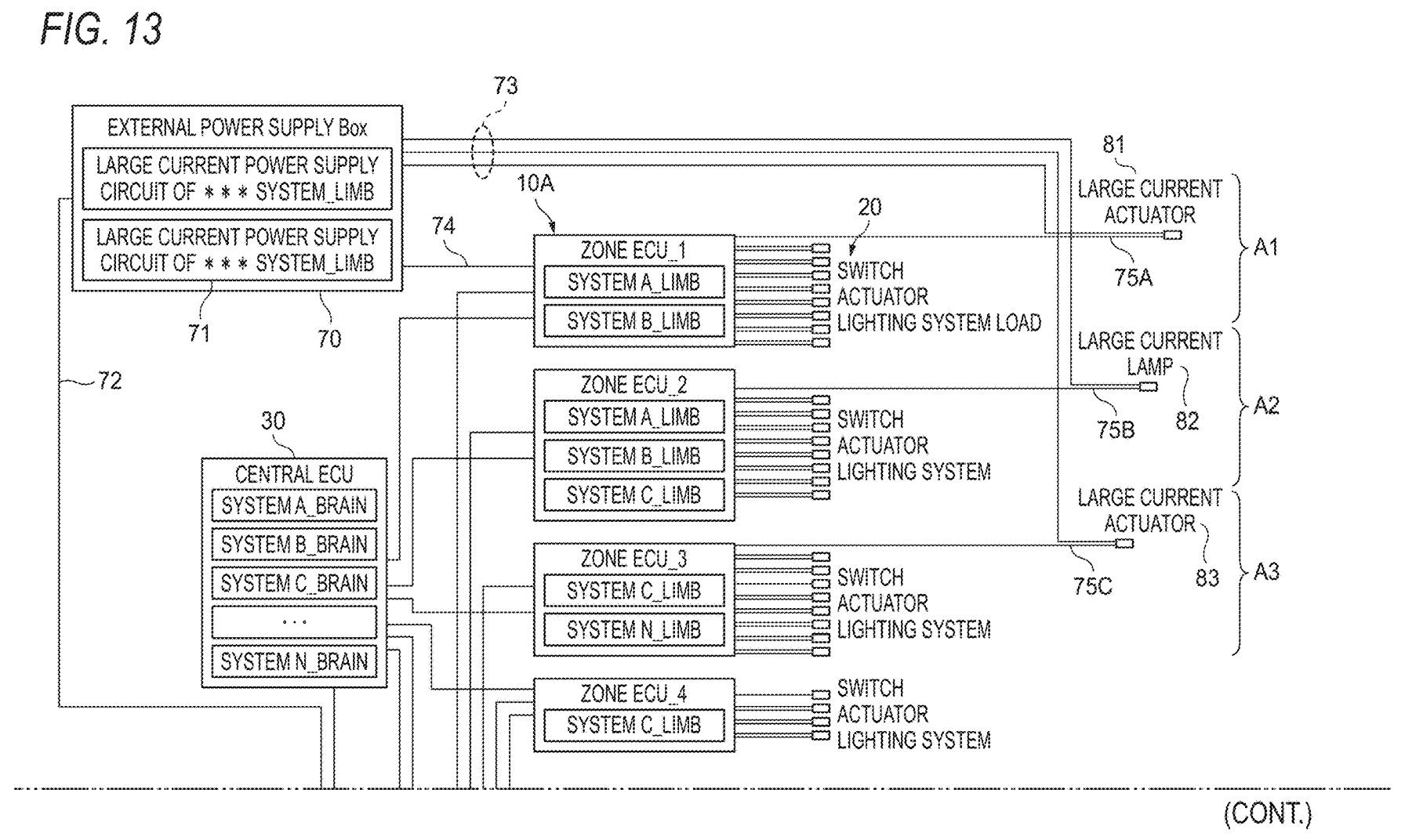

FIG. 13 is a block diagram illustrating a modification of the onboard connection system illustrated in FIG. 8.

An onboard connection system 100E illustrated in FIG. 13 further includes an external power supply box 70 in addition to the zone ECUs 10A, the central ECU 30, the independent ECUs 11 and 12, and the external power supply box 60 illustrated in FIG. 8. The added external power supply box 70 includes a plurality of large current power supply circuits 71 that supply the power supply electric power to loads each consuming a large current among the electrical components 20 disposed in the regions A1 to A4.

As illustrated in FIG. 13, a power supply input terminal of the external power supply box 70 is connected to the onboard battery 35 via a power supply path 72. Further, the external power supply box 70 is connected to the zone ECU 10A via a signal path 74. Further, a large current actuator 81 in the region A1, a large current lamp 82 in the region A2, and a large current actuator 83 in the region A3 are connected to a downstream side of the external power supply box 70 via the wire harness including independent power supply paths 73.

Therefore, even when the loads (81 to 83) each consuming a large current are included in the electrical components 20 disposed in the regions A1 to A4, no large current flows through the internal circuits of the zone ECUs 10A disposed in the regions A1 to A4. Accordingly, regarding the zone ECUs 10A, it is possible to reduce burdens such as a space required for disposing a large-sized power supply circuit, the heat generation measure, and the noise measure. In addition, it is easy to miniaturize the connector of each zone ECU 10A.

Configuration Example-5

FIG. 14 is a block diagram illustrating a modification at the vicinity of the zone ECU included in the onboard connection system.

For example, in a case in which the electrical components 20 controlled by the zone ECU 10A in any one of the regions refer to a rear combination lamp disposed on the rear side of the vehicle, it is assumed that the configuration illustrated in FIG. 14 is adopted.

In the configuration illustrated in FIG. 14, a function corresponding to the zone ECU 10A described above is achieved by a combination of a zone ECU 10B and a small-scale electronic unit 10C. The small-scale electronic unit 10C illustrated in FIG. 14 implements a part of the function included in the zone ECU 10A.

The zone ECU 10B has a configuration in which the implementation of the function of the small-scale electronic unit 10C as a part of the function included in the zone ECU 10A is omitted. Therefore, the zone ECU 10B is easily miniaturized as compared with the zone ECU 10A.

The central ECU 30 illustrated in FIG. 14 includes a power supply connector CN11 and a signal connector CN12. Further, the zone ECU 10B includes a connector CN21 on an upstream side and a connector CN22 on a downstream side. Further, the small-scale electronic unit 10C includes a connector CN31 on an upstream side, a connector CN32 on a downstream side, and a joint connector CN33.

The connector CN11 of the central ECU 30 is connected to the onboard battery 35 via the power supply path 42. Further, the connector CN12 of the central ECU 30 is connected to the connector CN21 of the zone ECU 10B via the signal path 43. Regarding the signal path 43, for example, a communication line capable of performing multiplex data communication such as Ethernet is adopted. Further, the connector CN21 and the onboard battery 35 are connected via the power supply path 41.

In the example of FIG. 14, the connector CN22 of the zone ECU 10B is connected to the connector CN31 of the small-scale electronic unit 10C via a wire harness WH2. The wire harness WH2 includes, for example, a signal line capable of performing multiplex data communication such as a LIN, a power supply line, and a ground (GND) line.

By performing signal transmission between the zone ECU 10B and the small-scale electronic unit 10C in the multiplex data communication, the number of signal lines included in the wire harness WH2 can be reduced. Further, by reducing a function implemented in the zone ECU 10B as compared with the zone ECU 10A, it is easy to reduce a diameter of the wire harness WH2.

A wire harness WH3 connected to the connector CN32 and the joint connector CN33 on the downstream side of the small-scale electronic unit 10C connects the small-scale electronic unit 10C to the electrical components 20 such as a brake lamp, a back lamp, and a winker lamp, which are loads. The wire harness WH3 includes an independent power supply line, a ground line, and a signal line for each load.

In the example of FIG. 14, the small-scale electronic unit 10C implements the control functions of the system A, the system B, the system C, and the like, and thus these functions are not required to be implemented in the zone ECU 10B. It is assumed that, for example, a function corresponding to a limb for controlling the electrical components 20 such as a power window and a door locking mechanism in the same region is implemented inside the zone ECU 10B.

Configuration Example-6

Figure 15:
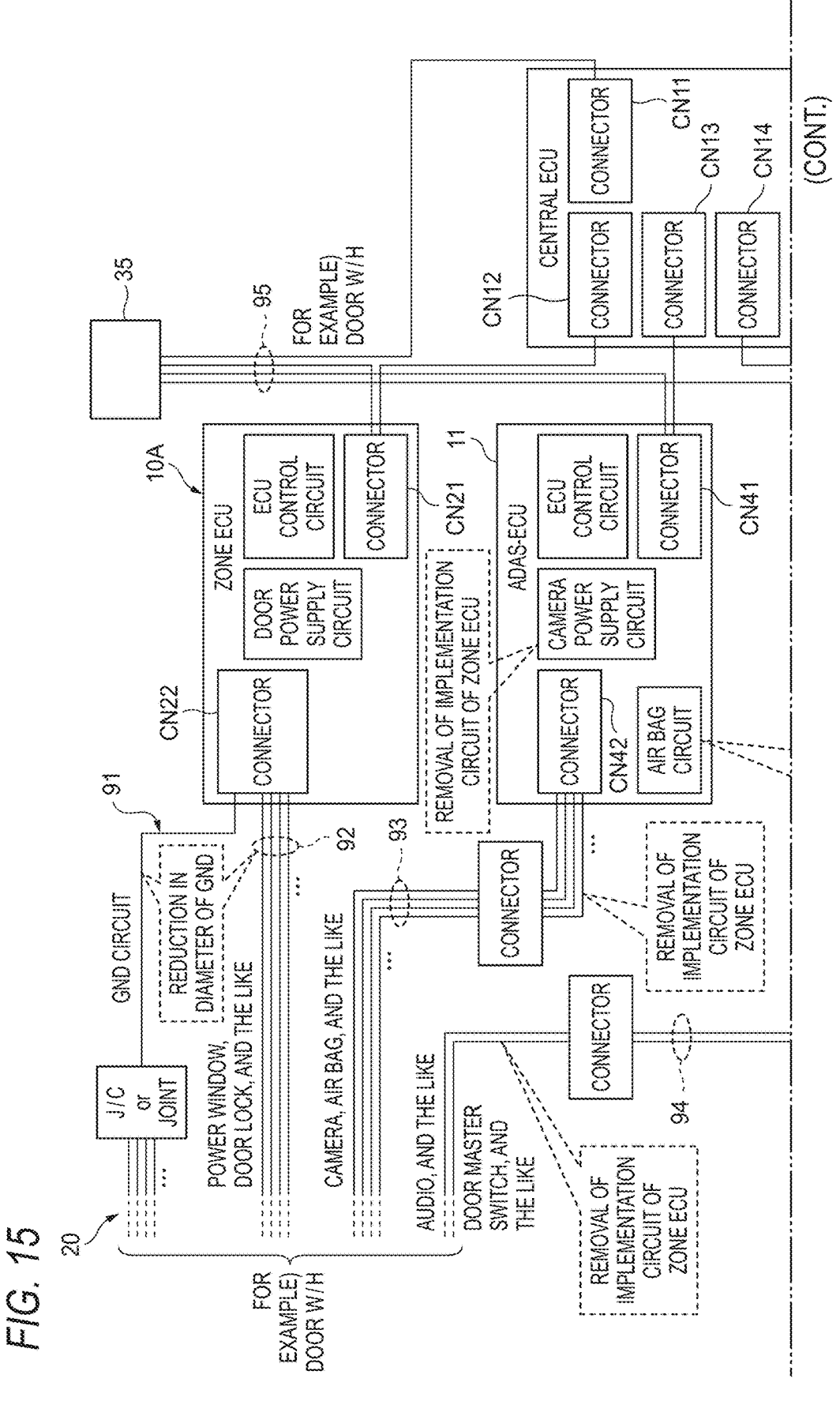
FIG. 15 is a block diagram illustrating specific examples of functions of units included in an onboard connection system.

FIG. 15 is a block diagram illustrating specific examples of functions of units included in an onboard connection system.

In the example of FIG. 15, a configuration of an onboard connection system 100F including the zone ECU 10A disposed in a region near a door of the vehicle is illustrated.

The zone ECU 10A in FIG. 15 includes an ECU control circuit and a door power supply circuit. Further, the independent ECU 11 in FIG. 15 has a control function of the advanced driver-assistance systems (ADAS), and includes a camera power supply circuit and an air bag circuit in addition to an ECU control circuit. Further, the independent ECU 12 in FIG. 15 has control functions of the human machine interface (HMI) and a multimedia (MM), and includes an audio circuit and a switch circuit in addition to an ECU control circuit.

The connector CN21 on the upstream side of the zone ECU 10A, a connector CN41 on an upstream side of the independent ECU 11, and a connector CN51 on an upstream side of the independent ECU 12 are connected to a wire harness 95 on an instrument panel side. The wire harness 95 includes an independent power supply line for each system connected to the onboard battery 35.

Further, the wire harness 95 also includes a plurality of independent signal lines for each system. That is, a signal line connecting the connector CN21 of the zone ECU 10A and the connector CN12 of the central ECU 30, a signal line connecting the connector CN41 of the independent ECU 11 and a connector CN13 of the central ECU 30, and a signal line connecting the connector CN51 of the independent ECU 12 and a connector CN14 of the central ECU 30 are included in the wire harness 95.

In addition, the connector CN22 on the downstream side of the zone ECU 10A is connected to wire harnesses 91 and 92. The wire harness 91 is connected to a ground circuit, and the wire harness 92 is connected to the electrical components 20 such as the power window and the door locking mechanism inside the door. The wire harness 92 includes a plurality of independent power supply lines and a plurality of signal lines for each electrical component 20.

A connector CN42 on the downstream side of the independent ECU 11 is connected to the electrical components 20 such as a camera and an air bag belonging to the advanced driver-assistance systems via a wire harness 93. The wire harness 93 includes a plurality of independent power supply lines and a plurality of signal lines for each electrical component 20.

A connector CN52 on the downstream side of the independent ECU 12 is connected to the electrical components 20 such as an audio device and a door master switch belonging to the human machine interface or the multimedia via a wire harness 94. The wire harness 94 includes a plurality of independent power supply lines and a plurality of signal lines for each electrical component 20.

In the onboard connection system 100F illustrated in FIG. 15, even when the electrical components 20 such as the air bag and the camera are included in the region near the door in which the zone ECU 10A is disposed, the zone ECU 10A does not need to supply the power supply electric power to these electrical components 20. That is, a path for supplying the power supply electric power to the electrical components 20 such as the air bag and the camera is transferred to the wire harness 93 on the downstream side of the independent ECU 11. Therefore, the number of power supply lines included in the wire harness 92 can be reduced, and a diameter of the wire harness 92 can be reduced.

In addition, since functions of the camera power supply circuit and the air bag circuit are provided on the independent ECU 11, even when the electrical components 20 such as the camera and the air bag are in the same region as the zone ECU 10A, control functions thereof are not required to be implemented in the zone ECU 10A. Therefore, an implementation circuit of the zone ECU 10A can be removed, and the zone ECU 10A can be miniaturized. In addition, the number of terminals of the connector CN22 can be reduced, and the connector CN22 can be miniaturized.

Characteristic matters regarding the above onboard connection system and the onboard system design method are briefly summarized in the following [1] to [5]. [1] An onboard connection system (100B) includes:

at least one zone ECU (10A) disposed in one of partitioned regions (A1 to A4) on a vehicle and configured to control a first device (the electrical components 20) disposed in the same region;

at least one independent ECU (11, 12) configured to control a second device (the electrical components 20 in the function group G1 or G2) independent of the control performed by the zone ECU without relation to the partition of the region in which the first device is disposed, the second device being disposed in one of the regions;

a central ECU (30) configured to manage the zone ECU and the independent ECU;

a first power supply connection path (the power supply paths 41 and 42) that connects an onboard power supply (the onboard battery 35) and power supply inputs of the zone ECU and the central ECU; and a second power supply connection path (the power supply paths 46 and 47) that is a path independent of the first power supply connection path and connects the onboard power supply and a power supply input of the independent ECU, in which power supply electric power to the second device is supplied from the independent ECU (via the power supply paths 51A and 52A).

According to the onboard connection system having the configuration described in the above [1], it is possible to reduce the diameter of the wire harness required for connecting the zone ECU disposed in each region and the first device disposed in the same region. That is, regarding the second device independent of the control performed by the zone ECU, even when the second device is the first device disposed in the same region as the zone ECU, it is not necessary to supply the power supply electric power from the zone ECU, and thus the number of power supply paths in the wire harness connected to the downstream side of the zone ECU can be reduced. In addition, it is also possible to remove the power supply circuit inside the zone ECU and miniaturize the connector.

[2] The onboard connection system (100C) according to the above [1] further includes:

a power supply box (the external power supply box 60) having a power supply electric power supply function with respect to a large current load consuming a large current in the second device;

a third power supply connection path (the power supply path 63) that is a path independent of the first power supply connection path and the second power supply connection path, and that connects the onboard power supply and a power supply input of the power supply box;

a fourth power supply connection path (the power supply paths 64) that connects a power supply output of the power supply box and the large current load; and a signal connection path (the signal paths 65 and 66) that connects a control signal of the independent ECU to the power supply box.

According to the onboard connection system having the configuration described in the above [2], it is not necessary to provide a power supply circuit through which a large current flows inside the independent ECU. Therefore, it is not necessary to secure the space for disposing the large-sized power supply circuit inside the independent ECU, and a special heat generation measure and a special noise measure are also unnecessary. Further, it is also easy to miniaturize the connector inside the independent ECU.

[3] The onboard connection system (100D) according to the above [1] or [2] further includes:

a switch signal connection path (the signal paths 44B) that connects a signal of at least a part of switches included in the first device and a signal input of the independent ECU.

According to the onboard connection system having the configuration described in the above [3], it is easy to intensively manage information on a large number of switches disposed in various regions by the independent ECU. In addition, it is easy to reduce the number of signal lines included in the wire harness connected to the downstream sides of the zone ECUs in the regions and reduce the diameter of the wire harness.

[4] The onboard connection system according to any one of the above [1] to [3] further includes:

a second power supply box (the external power supply box 70) having a power supply electric power supply function with respect to a second large current load consuming a large current in the first device;

a fifth power supply connection path (the power supply path 72) that is a path independent of the first power supply connection path and the second power supply connection path, and that connects the onboard power supply and a power supply input of the second power supply box; and a sixth power supply connection path (the power supply paths 73) that connects a power supply output of the second power supply box and the second large current load.

According to the onboard connection system having the configuration described in the above [4], it is not necessary to provide a power supply circuit through which a large current flows inside the zone ECU in each region. Therefore, it is not necessary to secure the space for disposing the large-sized power supply circuit inside the zone ECU, and a special heat generation measure and a special noise measure are also unnecessary. Further, it is also easy to miniaturize the connector inside the zone ECU.

[5] An onboard system design method includes:

a procedure (S11) for determining a plurality of regions (A1 to A4) formed by partitioning a space on a vehicle;

a procedure (S12) for determining, regarding each of the regions, disposition of zone ECUs (10A) each of which controls all devices (the electrical components 20) disposed in the corresponding region as control targets;

a procedure (S13) for determining disposition of a central ECU (30) having a function of integrally managing a plurality of the zone ECUs;

a procedure (S15) for determining, regarding each of the plurality of regions, a routing path of a first connection circuit that connects each of all the devices disposed in the corresponding region to the corresponding zone ECU;

a procedure (S16) for selectively extracting, as an independent function, a function separable from the control targets of the zone ECU among the devices (the electrical components 20) in each of the plurality of regions;

a procedure (S17) for determining an independent ECU that controls the independent function as a control target;

a procedure (S18) for separating a power supply connection path at a portion corresponding to the independent function assigned to the independent ECU in the first connection circuit from the zone ECU and transferring the power supply connection path to the independent ECU; and a procedure (S19) for reflecting a situation after the transferring of the power supply connection path and optimizing a configuration of a power supply connection circuit in at least a part of a wire harness.

By applying the onboard system design method described in the above [5] and performing designs of the wire harness and the like, it is easy to perform design work of a system configuration useful for miniaturizing the zone ECU and reducing the diameter of the wire harness for each part. For example, it is easy to design the onboard connection system 100B having the configuration illustrated in FIG. 6 from the state of the configuration illustrated in FIG. 1 through the state of the configuration illustrated in FIG. 2.

Note that, the present disclosure is not limited to the embodiment described above and can be appropriately modified, improved, and the like. In addition, materials, shapes, sizes, numbers, disposition positions and the like of components in the embodiment described above are freely selected and are not limited as long as the present disclosure can be implemented.

Note that the present application is based on a Japanese Patent Application (No. 2022-031889) filed on Mar. 2, 2022, the contents of which are incorporated herein by reference.

REFERENCE SIGNS LIST 10, 10A, 10B zone ECU
10C small-scale electronic unit
11, 12 independent ECU
20 electrical component
30 central ECU
35 onboard battery
41, 42, 45, 46, 47 power supply path
43, 44, 44A, 44B, 44C, 48 signal path
43-1, 43-2, 43-3 signal path
51, 51A, 52, 52A power supply path
60, 70 external power supply box
61, 62 large current control unit
63, 64, 72, 73 power supply path
65, 66, 74 signal path
71 large current power supply circuit
75A, 75B, 75C large current power supply path
81, 83 large current actuator
82 large current lamp
91, 92, 93, 94 wire harness
100, 100A, 100B, 100C, 100D onboard connection system
200 design assistance system
A1, A2, A3, A4 region
CN11, CN12, CN21, CN22, CN31, CN32 connector
CN33 joint connector
CN41, CN42, CN51, CN52 connector
DB1, DB2, DB3 data holding unit
G1, G2 function group
WH, WH1, WH2, WH3 wire harness

What is claimed is:

1. An onboard connection system, comprising:
at least one zone ECU that is disposed in one region of partitioned regions on a vehicle and that controls a first device disposed in the same region;
at least one independent ECU that controls a second device independent of the control performed by the zone ECU without relation to the partition of the region in which the first device is disposed, the second device being disposed in one of the regions;

a central ECU that manages the zone ECU and the independent ECU, respectively;

a first power supply connection path that connects an onboard power supply and each of power supply inputs of the zone ECU and the central ECU; and a second power supply connection path that is a path independent of the first power supply connection path and that connects the onboard power supply and a power supply input of the independent ECU, wherein power supply electric power to the second device is supplied from the independent ECU.

2. The onboard connection system according to claim 1, further comprising:

a power supply box having a power supply electric power supply function with respect to a large current load consuming a large current in the second device;

a third power supply connection path that is a path independent of the first power supply connection path and the second power supply connection path, and that connects the onboard power supply and a power supply input of the power supply box;

a fourth power supply connection path that connects a power supply output of the power supply box and the large current load; and a signal connection path that connects a control signal of the independent ECU to the power supply box.

3. The onboard connection system according to claim 1, further comprising:

a switch signal connection path that connects a signal of at least a part of switches included in the first device and a signal input of the independent ECU.

4. The onboard connection system according to claim 1, further comprising:

a second power supply box having a power supply electric power supply function with respect to a second large current load consuming a large current in the first device;

a fifth power supply connection path that is a path independent of the first power supply connection path and the second power supply connection path, and that connects the onboard power supply and a power supply input of the second power supply box; and a sixth power supply connection path that connects a power supply output of the second power supply box and the second large current load.

\* \* \* \* \*